(12) United States Patent
Chen et al.

(10) Patent No.: US 9,609,343 B1
(45) Date of Patent: Mar. 28, 2017

(54) VIDEO CODING USING COMPOUND PREDICTION

(71) Applicant: Google Inc., Mountain View, CA (US)

(72) Inventors: Yue Chen, Goleta, CA (US); Debargha Mukherjee, Cupertino, CA (US)

(73) Assignee: GOOGLE INC., Mountain View, CA (US)

( * ) Notice: Subject to any disclaimer, the term of this patent is extended or adjusted under 35 U.S.C. 154(b) by 348 days.

(21) Appl. No.: 14/136,053

(22) Filed: Dec. 20, 2013

(51) Int. Cl.
*H04N 19/50* (2014.01)
*H04N 19/107* (2014.01)

(52) U.S. Cl.
CPC .......... *H04N 19/50* (2014.11); *H04N 19/107* (2014.11)

(58) Field of Classification Search
CPC .......... H04N 7/26244; H04N 7/26031; H04N 7/26271; H04N 19/50; H04N 19/107
USPC ............................................. 375/12, 13, 14
See application file for complete search history.

(56) References Cited

U.S. PATENT DOCUMENTS

| | | | |
|---|---|---|---|
| 5,144,426 A | 9/1992 | Tanaka et al. |
| 5,737,020 A | 4/1998 | Hall et al. |
| 5,838,597 A | 11/1998 | Pau et al. |
| 6,032,113 A | 2/2000 | Graupe |
| 6,144,322 A | 11/2000 | Sato |
| 6,157,676 A | 12/2000 | Takaoka et al. |
| 6,167,162 A | 12/2000 | Jacquin et al. |
| 6,373,895 B2 | 4/2002 | Saunders et al. |
| 6,449,312 B1 | 9/2002 | Zhang et al. |
| 7,266,150 B2 | 9/2007 | Demos |
| 7,466,774 B2 | 12/2008 | Boyce |
| 7,529,302 B2 | 5/2009 | Mukerjee et al. |
| 7,580,456 B2 | 8/2009 | Li et al. |
| 7,606,310 B1 | 10/2009 | Ameres et al. |

(Continued)

FOREIGN PATENT DOCUMENTS

| | | |
|---|---|---|
| CN | 102186086 A | 9/2011 |
| JP | 2005348280 A | 12/2005 |

(Continued)

OTHER PUBLICATIONS

Bankoski et al. "Technical Overview of VP8, an Open Source Video Codec for the Web". Dated Jul. 11, 2011.

(Continued)

*Primary Examiner* — Francis G Geroleo
(74) *Attorney, Agent, or Firm* — Young Basile Hanlon & MacFarlane, P.C.

(57) ABSTRACT

Combining intra-frame and inter-frame prediction is described. A first combined prediction block for a first block is formed by combining weighted pixel values of a first inter prediction block and a first intra prediction block. The weighting is based on the intra prediction mode. A second combined prediction block is formed by selecting a second intra prediction block using a first partitioned area of the first block, selecting a second inter prediction block using a second partitioned area of the second block, the first and second partitioned areas separated by a border at an angle to an orientation of a row or column of pixels, and combining pixel values of the second inter and intra prediction blocks that are weighted by a weighting function based on a distance of a pixel from the border. One of the combined prediction blocks is selected to encode the first block.

19 Claims, 13 Drawing Sheets

(56) References Cited

U.S. PATENT DOCUMENTS

| | | | |
|---|---|---|---|
| 7,733,380 B1 | 6/2010 | Cote et al. | |
| 7,756,348 B2 | 7/2010 | Mukherjee et al. | |
| 7,809,059 B2 | 10/2010 | Yin et al. | |
| 8,005,144 B2 | 8/2011 | Ji et al. | |
| 8,085,845 B2 | 12/2011 | Tourapis et al. | |
| 8,085,846 B2* | 12/2011 | Tourapis | H04N 19/176 348/620 |
| 8,135,064 B2 | 3/2012 | Tasaka et al. | |
| 8,457,200 B2 | 6/2013 | Andersson et al. | |
| 8,644,374 B2 | 2/2014 | Chou et al. | |
| 8,705,616 B2 | 4/2014 | He et al. | |
| 8,718,140 B1 | 5/2014 | Cai et al. | |
| 8,737,824 B1* | 5/2014 | Bultje | H04N 5/765 386/353 |
| 8,929,450 B2 | 1/2015 | Lou et al. | |
| 9,066,104 B2 | 6/2015 | Wang et al. | |
| 9,185,414 B1 | 11/2015 | Suvanto | |
| 2002/0181594 A1 | 12/2002 | Katsavounidis et al. | |
| 2003/0012285 A1 | 1/2003 | Kim | |
| 2003/0012287 A1 | 1/2003 | Katsavounidis et al. | |
| 2003/0026343 A1 | 2/2003 | Kim et al. | |
| 2003/0227977 A1 | 12/2003 | Henocq | |
| 2004/0051798 A1 | 3/2004 | Kakarala et al. | |
| 2005/0018772 A1 | 1/2005 | Sung et al. | |
| 2005/0105614 A1 | 5/2005 | Katsavounidis et al. | |
| 2005/0105625 A1 | 5/2005 | Kim et al. | |
| 2005/0149831 A1 | 7/2005 | Katsavounidis et al. | |
| 2005/0207497 A1 | 9/2005 | Rovati et al. | |
| 2005/0243920 A1 | 11/2005 | Murakami et al. | |
| 2005/0254584 A1 | 11/2005 | Kim et al. | |
| 2005/0281479 A1 | 12/2005 | Song | |
| 2006/0029136 A1 | 2/2006 | Cieplinski et al. | |
| 2006/0195881 A1 | 8/2006 | Segev et al. | |
| 2006/0215751 A1 | 9/2006 | Reichel et al. | |
| 2006/0245497 A1 | 11/2006 | Tourapis et al. | |
| 2007/0047648 A1* | 3/2007 | Tourapis | H04N 19/176 375/240.13 |
| 2007/0047649 A1 | 3/2007 | Suzuki et al. | |
| 2007/0053427 A1 | 3/2007 | Henocq | |
| 2007/0098067 A1* | 5/2007 | Kim | H04N 19/176 375/240.08 |
| 2007/0110202 A1 | 5/2007 | Casler et al. | |
| 2007/0140352 A1 | 6/2007 | Bhaskaran et al. | |
| 2007/0153897 A1 | 7/2007 | Yan | |
| 2007/0153899 A1 | 7/2007 | Koto et al. | |
| 2007/0206931 A1 | 9/2007 | Barbieri et al. | |
| 2008/0056356 A1 | 3/2008 | Wang et al. | |
| 2008/0084929 A1 | 4/2008 | Li | |
| 2008/0130754 A1 | 6/2008 | Winger | |
| 2008/0212678 A1 | 9/2008 | Booth et al. | |
| 2008/0247464 A1 | 10/2008 | Seregin et al. | |
| 2008/0260031 A1 | 10/2008 | Karczewicz | |
| 2008/0267292 A1 | 10/2008 | Ito et al. | |
| 2008/0285655 A1 | 11/2008 | Au et al. | |
| 2009/0010556 A1 | 1/2009 | Uchibayashi et al. | |
| 2009/0034619 A1 | 2/2009 | Mukherjee et al. | |
| 2009/0080518 A1 | 3/2009 | Au et al. | |
| 2009/0110067 A1 | 4/2009 | Sekiguchi et al. | |
| 2009/0175338 A1 | 7/2009 | Segall | |
| 2009/0196342 A1* | 8/2009 | Divorra Escoda | H04N 19/50 375/240.02 |
| 2009/0232207 A1 | 9/2009 | Chen | |
| 2009/0257492 A1* | 10/2009 | Andersson | H04N 19/105 375/240.12 |
| 2009/0257495 A1 | 10/2009 | Chujoh et al. | |
| 2010/0034260 A1 | 2/2010 | Shimizu et al. | |
| 2010/0128995 A1* | 5/2010 | Drugeon | H04N 19/00733 382/238 |
| 2010/0150394 A1 | 6/2010 | Bloom et al. | |
| 2010/0177826 A1 | 7/2010 | Bhaumik et al. | |
| 2010/0195715 A1 | 8/2010 | Liu et al. | |
| 2010/0220790 A1 | 9/2010 | Jeon et al. | |
| 2010/0266008 A1 | 10/2010 | Reznik | |
| 2010/0278269 A1 | 11/2010 | Andersson et al. | |
| 2010/0290530 A1 | 11/2010 | Huang et al. | |
| 2010/0303149 A1 | 12/2010 | Yasuda et al. | |
| 2011/0002386 A1 | 1/2011 | Zhang | |
| 2011/0032983 A1 | 2/2011 | Sezer | |
| 2011/0051804 A1 | 3/2011 | Chou et al. | |
| 2011/0182357 A1 | 7/2011 | Kim et al. | |
| 2011/0200109 A1 | 8/2011 | Joshi et al. | |
| 2011/0202160 A1 | 8/2011 | Moyne | |
| 2011/0222608 A1 | 9/2011 | Gao et al. | |
| 2011/0228840 A1 | 9/2011 | Yamori | |
| 2011/0228858 A1 | 9/2011 | Budagavi et al. | |
| 2011/0235930 A1 | 9/2011 | Kim et al. | |
| 2011/0243229 A1 | 10/2011 | Kim et al. | |
| 2011/0249734 A1 | 10/2011 | Segall et al. | |
| 2011/0249741 A1 | 10/2011 | Zhao et al. | |
| 2011/0249756 A1 | 10/2011 | Doepke | |
| 2011/0261886 A1 | 10/2011 | Suzuki et al. | |
| 2011/0280304 A1 | 11/2011 | Jeon et al. | |
| 2012/0008683 A1 | 1/2012 | Karczewicz et al. | |
| 2012/0027094 A1 | 2/2012 | Sato et al. | |
| 2012/0082219 A1 | 4/2012 | Sun et al. | |
| 2012/0201293 A1 | 8/2012 | Guo et al. | |
| 2012/0250769 A1 | 10/2012 | Bross et al. | |
| 2012/0300837 A1 | 11/2012 | Wilkins et al. | |
| 2012/0307884 A1 | 12/2012 | MacInnis | |
| 2013/0022102 A1 | 1/2013 | Casula | |
| 2013/0022119 A1 | 1/2013 | Chien et al. | |
| 2013/0027230 A1 | 1/2013 | Marpe et al. | |
| 2013/0051467 A1* | 2/2013 | Zhou | H04N 19/105 375/240.13 |
| 2013/0129237 A1* | 5/2013 | Yie | G06T 9/004 382/233 |
| 2013/0259129 A1 | 10/2013 | Sato | |
| 2014/0140408 A1 | 5/2014 | Lee et al. | |
| 2014/0294320 A1 | 10/2014 | Kokaram et al. | |
| 2016/0065968 A1 | 3/2016 | Suvanto | |

FOREIGN PATENT DOCUMENTS

| | | | |
|---|---|---|---|
| JP | 2007267414 A | 10/2007 | |
| KR | 20120135828 A | 12/2012 | |
| WO | 2009051419 A2 | 4/2009 | |
| WO | 2012126340 A1 | 9/2012 | |

OTHER PUBLICATIONS

Bankoski et al. "VP8 Data Format and Decoding Guide" Independent Submission. RFC 6389, Dated Nov. 2011.

Bankoski et al. "VP8 Data Format and Decoding Guide; draft-bankoski-vp8-bitstream-02" Network Working Group. Internet-Draft, May 18, 2011, 288 pp.

Cassidy, Sean, An Analysis of VP8, a New Video Codec for the Web, Nov. 2011, Rochester Institute of Technology, Rochester NY.

Chen, et al., "SaVE: Sensor-assisted Motion Estimation for Efficient H.264/AVC Video Encoding." MM'09, Oct. 19-24, 2009, 10 pages, ACM, Beijing, China.

Chen, Michael C., et al.; "Design and Optimization of a Differentially Coded Variable Block Size Motion Compensation System", IEEE 1996, 4 pp.

Chen, Xing C., et al.; "Quadtree Based Adaptive Lossy Coding of Motion Vectors", IEEE 1996, 4 pp.

Guillotel, Philippe, et al.; "Comparison of motion vector coding techniques", SPIE vol. 2308, 1994, 11 pp.

H.264 video compression standard.: New possibilities within video surveillance. 2008, 10 pages, Axis Communications.

International Search Report and Written Opinion of the International Searching Authority for International Application No. PCT/US2012/021599 , Mar. 28, 2012.

International Search Report and Written Opinion of the International Searching Authority for International Application No. PCT/US2012/021606, Mar. 28, 2012.

Jung,, J., "Core Experiment 9: Motion Vector Coding," Document # JCTVC-0509, Guangzhou, China, Oct. 2010.

Karczewicz, Marta, et al.; "Video Coding Using Motion Compensation With Polynomial Motion Vector Fields", IEEE COMSOC

(56) References Cited

OTHER PUBLICATIONS

EURASIP, First International Workshop on Wireless Image/Video Communications—Sep. 1996, 6 pp.
Kim, Jong Won, et al.; "On the Hierarchical Variable Block Size Motion Estimation Technique for Motion Sequence Coding", SPIE Visual Communication and Image Processing 1993, Cambridge, MA, Nov. 8, 1993, 29 pp.
Kuroki et al., Adaptive Arithmetic Coding for Image Prediction Errors, 2004.
Li B., et al., "Redundancy reduction in Cbf and merge coding", Document # JCTVC-C277, p. 6, Oct. 2, 2010.
Li S., et al.; "Direct Coding for Bipredicitive Slices in the H.264 Standard," IEEE Transactions on Circuits and Systems for Video Technology; vol. 15; No. 1; pp. 119-126; Jan. 1, 2005.
Liu, Bede, et al.; "A simple method to segment motion field for video coding", SPIE vol. 1818, Visual Communications and Image Processing 1992, 10 pp.
Luttrell, Max, et al.; "Simulation Results for Modified Error Resilient Syntax With Data Partitioning and RVLC", ITU—Telecommunications Standardization Sector, Study Group 16, Video Coding Experts Group (Question 15), Sixth Meeting: Seoul, SouthKorea, Nov. 2, 1998, 34 pp.
Martin, Graham R., et al.; "Reduced Entropy Motion Compensation Using Variable Sized Blocks", SPIE vol. 3024, 1997, 10 pp.
Mozilla, "Introduction to Video Coding Part 1: Transform Coding", Video Compression Overview, Mar. 2012, 171 pp.
Nicolas, H., et al.; "Region-based motion estimation using deterministic relaxation schemes for image sequence coding", IEEE 1992, 4 pp.
Nokia, Inc., Nokia Research Center, "MVC Decoder Description", Telecommunication Standardization Sector, Study Period 1997-2000, Geneva, Feb. 7, 2000, 99 pp.
Orchard, Michael T.; "Exploiting Scene Structure in Video Coding", IEEE 1991, 5 pp.
Orchard, Michael T.; "Predictive Motion-Field Segmentation for Image Sequence Coding", IEEE Transactions on circuits and Systems for Video Technology, vol. 3, No. 1, Feb. 1993, 17 pp.
Overview; VP7 Data Format and Decoder. Version 1.5. On2 Technologies, Inc. Dated Mar. 28, 2005.
Schiller, H., et al.; "Efficient Coding of Side Information in a Low Bitrate Hybrid Image Coder", Signal Processing 19 (1990) Elsevier Science Publishers B.V. 61-73, 13 pp.
Schuster, Guido M., et al.; "A Video Compression Scheme With Optimal Bit Allocation Among Segmentation, Motion, and Residual Error", IEEE Transactions on Image Processing, vol. 6, No. 11, Nov. 1997, 16 pp.
Seiler, et al., "Spatio-Temporal Prediction in Video Coding by Spatially Refined Motion Compensation," ICIP, 2008, pp. 2788-2791.
Series H: Audiovisual and Multimedia Systems, Infrastructure of audiovisual services—Coding of moving video, Video coding for low bit rate communication, International Telecommunication Union, ITU-T Recommendation H.263, Feb. 1998, 167 pp.
Series H: Audiovisual and Multimedia Systems; Infrastructure of audiovisual services—Coding of moving video. H.264. Amendment 2: New profiles for professional applications. International Telecommunication Union. Dated Apr. 2007.
Series H: Audiovisual and Multimedia Systems; Infrastructure of audiovisual services—Coding of moving video; Advanced video coding for generic audiovisual services. H.264. Amendment 1: Support of additional colour spaces and removal of the High 4:4:4 Profile. International Telecommunication Union. Dated Jun. 2006.
Series H: Audiovisual and Multimedia Systems; Infrastructure of audiovisual services—Coding of moving video; Advanced video coding for generic audiovisual services. H.264. Version 3. International Telecommunication Union. Dated Mar. 2005.
Somasundaram et al., A Pattern-Based Residual Vector Quantization Algorithm (PBRVQ) for Compressing Images, 2009.
Steliaros, Michael K., et al.; "Locally-accurate motion estimation for object-based video coding", SPIE vol. 3309, 1997, 11 pp.
Stiller, Christoph; "Motion-Estimation for Coding of Moving Video at 8 kbit/s with Gibbs Modeled Vectortield Smoothing", SPIE vol. 1360 Visual Communications and Image Processing 1990, 9 pp.
Strobach, Peter; "Tree-Structured Scene Adaptive Coder", IEEE Transactions on Communications, vol. 38, No. 4, Apr. 1990, 10 pp.
Sun et al., Motion-Compensated Vector Quantization with a Dynamic Codebook, 1990.
VP6 Bitstream & Decoder Specification. Version 1.03. On2 Technologies, Inc. Dated Oct. 29, 2007.
WebM Project, WebM Video Hardware RTLs, http://www.webmproject.org/hardware/, 3 pp, (Jun. 27, 2012).
Wiegand, Thomas, et al.; Long-Term Memory Motion-Compensated Prediction, date unknown.
Wiegand, Thomas, et al.; "Rate-Distortion Optimized Mode Selection for Very Low Bit Rate Video Coding and the Emerging H.263 Standard", IEEE Transactions on Circuits and Systems for Video Technology, vol. 6, No. 2, Apr. 1996, 9 pp.
Wikipedia, the free encyclopedia, "Application-specific integrated circuit", http://en.wikipedia.org/wiki/Application-specific_integrated_circuit, 7 pp (Jun. 27, 2012).
Winken (Fraunhofer HHI) M. et al., "Description of Video Coding Technology Proposal by Fraunhoffer HHI", 1. JCT-VC Meeting Apr. 15, 2010-Apr. 23, 2010; Dresden; (Joint Collaborative Team on Video Coding of IS/IEC JTC1/SC29/WG11 and ITU-T SG.16); JCTVC-A116, URL:http://wftp3.itu.int/AV-ARCH/JCTVC-SITE/, No. 24 Apr. 2010, all pages.
Xiao, "Macroblock Level Hybrid Temporal-Spatial Prediction for H.264/AVC," Circuits and Systems (ISCAS), Proceedings of 2010 IEEE International Symposium, Paris, 4 pages.
Yusuke Itani et al., "Adaptive Direct Vector Derivation for Video Coding," Picture Coding Symposium, Dec. 8, 2010 C509, Guangzhou, China, Oct. 2010.
X. Jin, K. Ngan, and G. Zhu, Combined Inter-Intra Prediction for High Definition Video Coding, Picture Coding Symposium 2007.
E. M. Hung, R. L. de Queiroz and D. Mukherjee, "On macroblock partition for motion compensation," Proc. IEEE Intl. Conf. on Image Processing, ICIP, Atlanta, USA, pp. 16971700, Oct. 2006.

* cited by examiner

VIDEO CODING USING COMPOUND PREDICTION

BACKGROUND

Digital video streams typically represent video using a sequence of frames or still images. Each frame can include a number of blocks, which in turn may contain information describing the value of color, brightness or other attributes for pixels. The amount of data in a typical video stream is large, and transmission and storage of video can use significant computing or communications resources. Various approaches have been proposed to reduce the amount of data in video streams, including compression and other encoding techniques. Real-time video streaming, multi-point video conferencing or video broadcasting are examples of applications that employ video stream encoding including compression.

SUMMARY

This disclosure relates in general to encoding and decoding visual data, such as video stream data, using combined inter and intra predictors. One method described herein includes forming a first combined prediction block for a first block of a video frame by combining weighted pixel values of a first inter prediction block for the first block and weighted pixel values of a first intra prediction block for the first block, wherein a weighting of each pixel value is based on a first intra prediction mode used to generate the intra prediction block, and forming a second combined prediction block for the first block of a video frame by selecting a second intra prediction block for the first block using a first partitioned area of the first block, selecting a second inter prediction block for the first block using a second partitioned area of the second block, the first partitioned area and the second partitioned area separated by a border, wherein the border is at an angle to an orientation of a row or column of pixels, combining pixel values of the second intra prediction block and pixel values of the second inter prediction block, the pixel values of the second intra prediction block and the pixel values of the second inter prediction block weighted by a weighting function based on a distance of a pixel from the border. The method also includes selecting the first combined prediction block or the second combined prediction block as a predictor block to encode the first block, and encoding the first block into a bitstream using the predictor block.

An apparatus described herein includes a memory and a processor. In one aspect, the processor is configured to execute instructions stored in the memory to form a first combined prediction block for a first block of a video frame by combining weighted pixel values of a first inter prediction block for the first block and weighted pixel values of a first intra prediction block for the first block, wherein a weighting of each pixel value is based on a first intra prediction mode used to generate the intra prediction block, and to form a second combined prediction block for the first block of a video frame by selecting a second intra prediction block for the first block using a first partitioned area of the first block, selecting a second inter prediction block for the first block using a second partitioned area of the second block, the first partitioned area and the second partitioned area separated by a border, wherein the border is at an angle to an orientation of a row or column of pixels, combining pixel values of the second intra prediction block and pixel values of the second inter prediction block, the pixel values of the second intra prediction block and the pixel values of the second inter prediction block weighted by a weighting function based on a distance of a pixel from the border. The processor is also configured to execute instructions stored in the memory to select the first combined prediction block or the second combined prediction block as a predictor block to encode the first block, and encode the first block into a bitstream using the predictor block.

Variations in these and other aspects of this disclosure will be described in additional detail hereafter.

BRIEF DESCRIPTION OF THE DRAWINGS

The description herein makes reference to the accompanying drawings wherein like reference numerals refer to like parts throughout the several views, and wherein:

FIG. 8 is a diagram of a 4×4 block used to illustrate adjacent pixels used in the formation of an intra prediction block;

FIGS. 9A-9H are diagrams showing examples of intra prediction modes for the block of FIG. 8;

DETAILED DESCRIPTION

A video stream may be compressed by a variety of techniques to reduce bandwidth required transmit or store the video stream. A video stream can be encoded, which can involve compression, and then transmitted to a decoder that can decode or decompress the video stream to prepare it for viewing or further processing. Techniques for encoding video streams include prediction, which attempts to predict the pixel values of a block of a frame of a video stream using either pixels peripheral to the block to be predicted, called intra prediction, or attempts to predict the pixel values of a block using a possibly displaced block or blocks from a temporally nearby frame or frames, called inter prediction. In either case, a prediction block is generated and subtracted from the block to be encoded to form a residual block representing the difference between the blocks. The residual block can be further encoded to reduce the number of bits to be included in the output encoded video bitstream in comparison to encoding the original block while maintaining the quality of the decoded video stream.

A prediction block resulting from inter prediction may be called an inter predictor herein, while a prediction block resulting from intra prediction may called an intra predictor herein. Conventionally, blocks are compressed using an inter or intra predictor, but not both. However, these (e.g., square or rectangular) blocks will have two types of contents when located around the edges of motion fields within the images. One type is existing content, which can be inter predicted with good results. The other type contains new objects, which can be better handled by intra prediction, that appear around the edge of the motion fields.

Implementations of the teachings herein combine intra and inter prediction blocks to form a prediction block. This is referred to herein as compound prediction. The combining may be performed by including both the intra predictor and inter predictor in separate portions of a block or by generating a weighted summation of the two predictors. The compound prediction schemes described herein allow flexible weights adapted to textures and pixel positions and also allow the application of inter and intra prediction separately on parts partitioned by irregular oblique lines that are adapted to edges of motion fields. Predictive coding of video streams may be improved through the selection of an intra predictor, an inter predictor or a compound predictor.

The teachings herein are first described in an environment in which they may be implemented and are then described by reference to certain examples.

Figure 1:
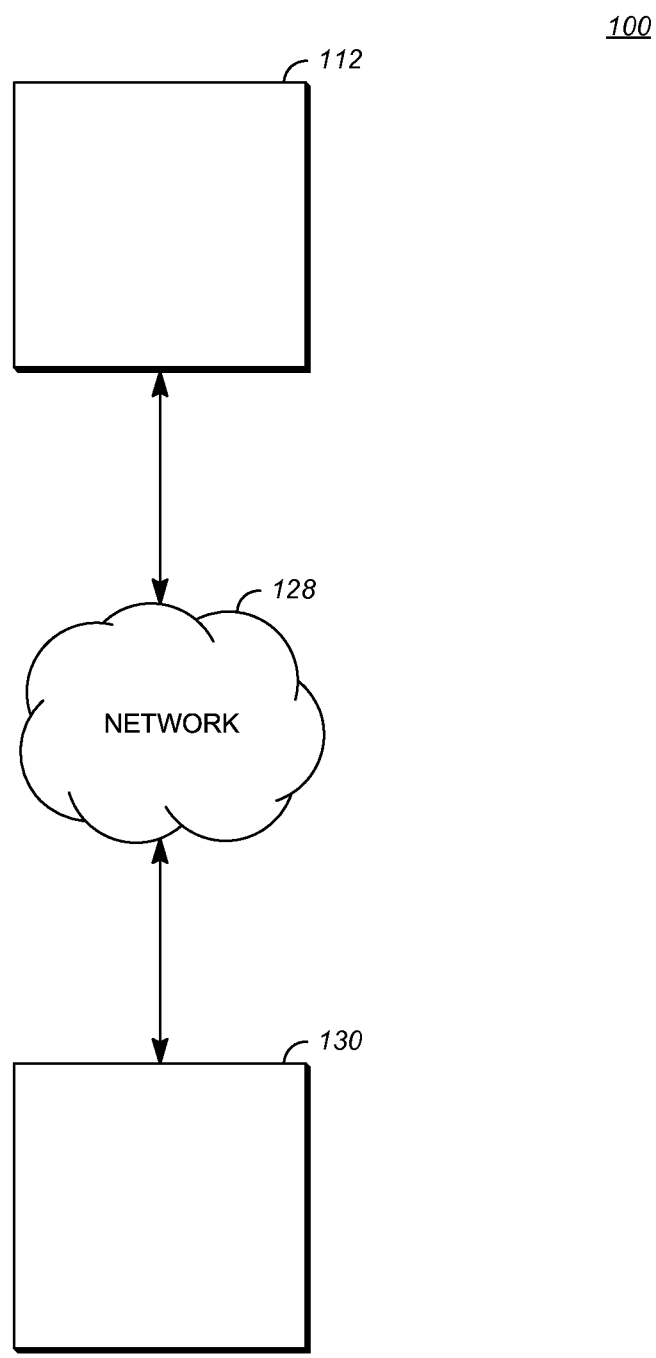
FIG. 1 is a schematic of a video encoding and decoding system.

FIG. 1 is a schematic of a video encoding and decoding system 100 in which the teachings herein may be implemented. An exemplary transmitting station 112 can be, for example, a computer having an internal configuration of hardware such as that described in FIG. 2. However, other suitable implementations of transmitting station 112 are possible. For example, the processing of transmitting station 112 can be distributed among multiple devices.

A network 128 can connect transmitting station 112 and a receiving station 130 for encoding and decoding of the video stream. Specifically, the video stream can be encoded in transmitting station 112 and the encoded video stream can be decoded in receiving station 130. Network 128 can be, for example, the Internet. Network 128 can also be a local area network (LAN), wide area network (WAN), virtual private network (VPN), cellular telephone network or any other means of transferring the video stream from transmitting station 112 to, in this example, receiving station 130.

Figure 2:
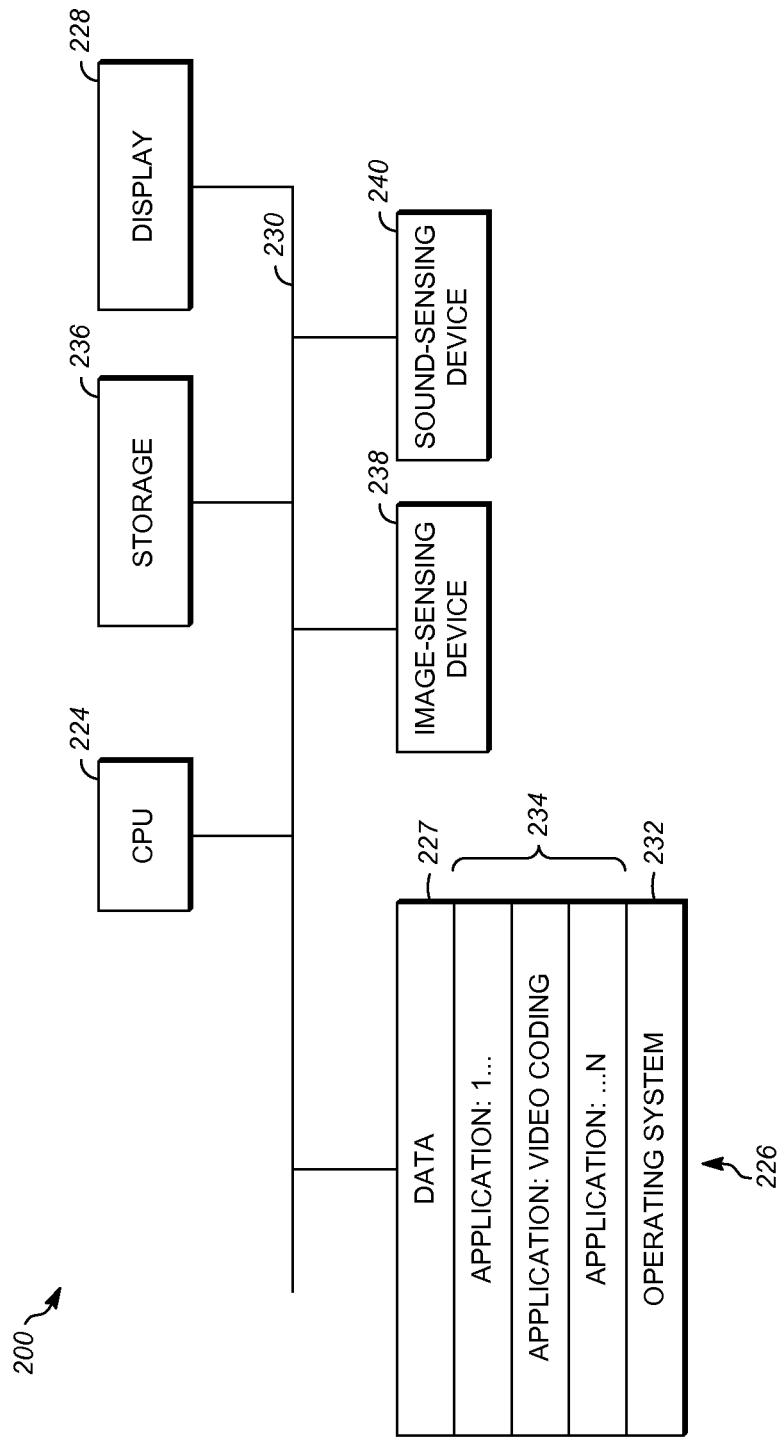
FIG. 2 is a block diagram of an exemplary computing device that can implement a transmitting station or a receiving station.

Receiving station 130, in one example, can be a computer having an internal configuration of hardware such as that described in FIG. 2. However, other suitable implementations of receiving station 130 are possible. For example, the processing of receiving station 130 can be distributed among multiple devices.

Other implementations of video encoding and decoding system 100 are possible. For example, an implementation can omit network 128. In another implementation, a video stream can be encoded and then stored for transmission at a later time to receiving station 130 or any other device having memory. In one implementation, receiving station 130 receives (e.g., via network 128, a computer bus, and/or some communication pathway) the encoded video stream and stores the video stream for later decoding. In an exemplary implementation, a real-time transport protocol (RTP) is used for transmission of the encoded video over network 128. In another implementation, a transport protocol other than RTP may be used, e.g., an HTTP-based video streaming protocol.

When used in a video conferencing system, for example, transmitting station 112 and/or receiving station 130 may include the ability to both encode and decode a video stream as described below. For example, receiving station 130 could be a video conference participant who receives an encoded video bitstream from a video conference server (e.g., transmitting station 112) to decode and view and further encodes and transmits its own video bitstream to the video conference server for decoding and viewing by other participants.

FIG. 2 is a block diagram of an exemplary computing device 200 that can implement a transmitting station or a receiving station. For example, computing device 200 can implement one or both of transmitting station 112 and receiving station 130 of FIG. 1. Computing device 200 can be in the form of a computing system including multiple computing devices, or in the form of a single computing device, for example, a mobile phone, a tablet computer, a laptop computer, a notebook computer, a desktop computer, and the like.

A CPU 224 in computing device 200 can be a conventional central processing unit. Alternatively, CPU 224 can be any other type of device, or multiple devices, capable of manipulating or processing information now-existing or hereafter developed. Although the disclosed implementations can be practiced with a single processor as shown, e.g., CPU 224, advantages in speed and efficiency can be achieved using more than one processor.

A memory 226 in computing device 200 can be a read only memory (ROM) device or a random access memory (RAM) device in an implementation. Any other suitable type of storage device can be used as memory 226. Memory 226 can include code and data 227 that is accessed by CPU 224 using a bus 230. Memory 226 can further include an operating system 232 and application programs 234, the application programs 234 including at least one program that permits CPU 224 to perform the methods described here. For example, application programs 234 can include applications 1 through N, which further include a video coding application that performs the methods described here. Computing device 200 can also include a secondary storage 236, which can, for example, be a memory card used with a mobile computing device 200. Because the video communication sessions may contain a significant amount of information, they can be stored in whole or in part in secondary storage 236 and loaded into memory 226 as needed for processing.

Computing device 200 can also include one or more output devices, such as a display 228. Display 228 may be, in one example, a touch sensitive display that combines a display with a touch sensitive element that is operable to sense touch inputs. Display 228 can be coupled to CPU 224 via bus 230. Other output devices that permit a user to program or otherwise use computing device 200 can be provided in addition to or as an alternative to display 228. When the output device is or includes a display, the display can be implemented in various ways, including by a liquid crystal display (LCD), a cathode-ray tube (CRT) display or light emitting diode (LED) display, such as an OLED display.

Computing device 200 can also include or be in communication with an image-sensing device 238, for example a camera, or any other image-sensing device 238 now existing or hereafter developed that can sense an image such as the image of a user operating computing device 200. Image-sensing device 238 can be positioned such that it is directed toward the user operating computing device 200. In an example, the position and optical axis of image-sensing device 238 can be configured such that the field of vision includes an area that is directly adjacent to display 228 and from which display 228 is visible.

Computing device 200 can also include or be in communication with a sound-sensing device 240, for example a microphone, or any other sound-sensing device now existing or hereafter developed that can sense sounds near computing device 200. Sound-sensing device 240 can be positioned such that it is directed toward the user operating computing device 200 and can be configured to receive sounds, for example, speech or other utterances, made by the user while the user operates computing device 200.

Although FIG. 2 depicts CPU 224 and memory 226 of computing device 200 as being integrated into a single unit, other configurations can be utilized. The operations of CPU 224 can be distributed across multiple machines (each machine having one or more of processors) that can be coupled directly or across a local area or other network. Memory 226 can be distributed across multiple machines such as a network-based memory or memory in multiple machines performing the operations of computing device 200. Although depicted here as a single bus, bus 230 of computing device 200 can be composed of multiple buses. Further, secondary storage 236 can be directly coupled to the other components of computing device 200 or can be accessed via a network and can comprise a single integrated unit such as a memory card or multiple units such as multiple memory cards. Computing device 200 can thus be implemented in a wide variety of configurations.

Figure 3:
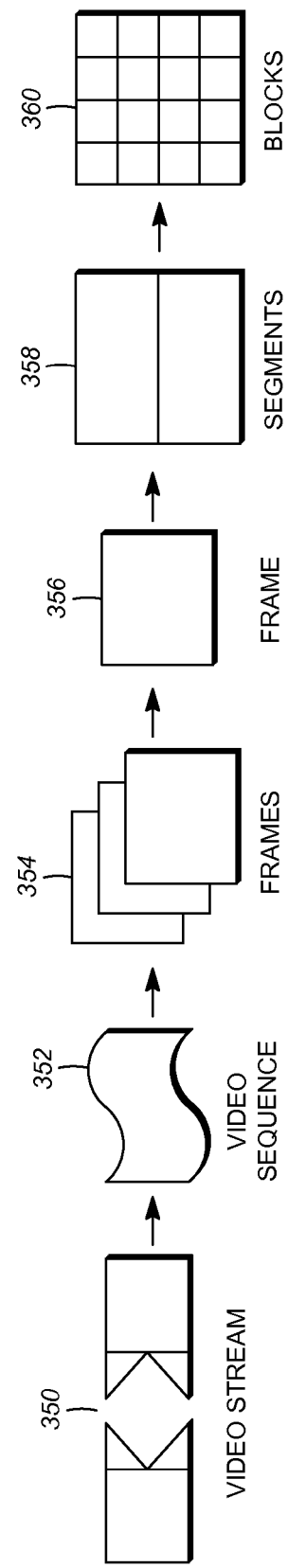
FIG. 3 is a diagram of a typical video stream to be encoded and subsequently decoded.

FIG. 3 is a diagram of an example of a video stream 350 to be encoded and subsequently decoded. Video stream 350 includes a video sequence 352. At the next level, video sequence 352 includes a number of adjacent frames 354. While three frames are depicted as adjacent frames 354, video sequence 352 can include any number of adjacent frames 354. Adjacent frames 354 can then be further subdivided into individual frames, e.g., a single frame 356. At the next level, a single frame 356 can be divided into a series of segments or planes 358. Segments (or planes) 358 can be subsets of frames that permit parallel processing, for example. Segments 358 can also be subsets of frames that can separate the video data into separate colors. For example, a frame 356 of color video data can include a luminance plane and two chrominance planes. Segments 358 may be sampled at different resolutions.

Whether or not frame 356 is divided into segments 358, frame 356 may be further subdivided into blocks 360, which can contain data corresponding to, for example, 16×16 pixels in frame 356. Blocks 360 can also be arranged to include data from one or more planes of pixel data. Blocks 360 can also be of any other suitable size such as 4×4, 8×8 16×8, 8×16, 16×16 or larger. Unless otherwise noted, the terms block and macroblock are used interchangeably herein.

Figure 4:
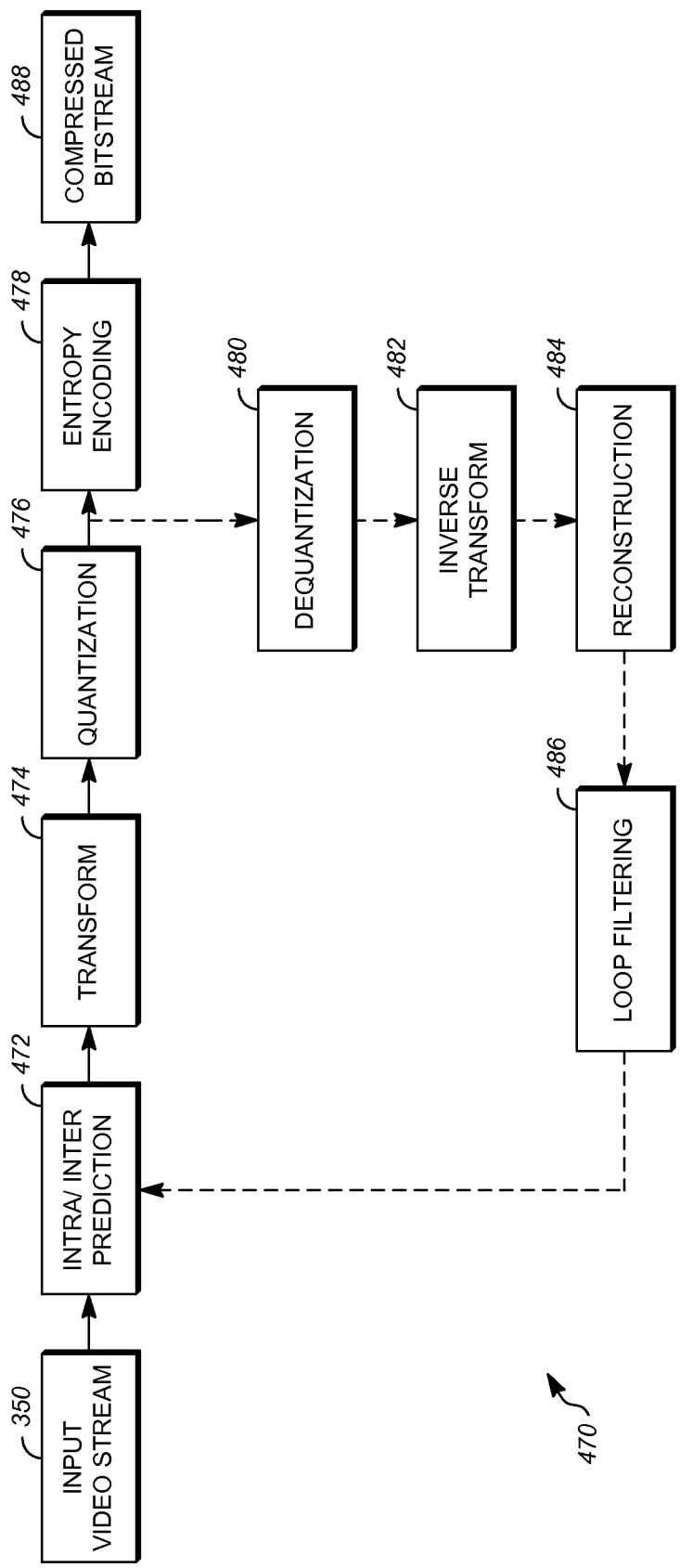
FIG. 4 is a block diagram of a video compression system according to an aspect of the teachings herein.

FIG. 4 is a block diagram of an encoder 470 in accordance with an implementation. Encoder 470 can be implemented, as described above, in transmitting station 112 such as by providing a computer software program stored in memory, for example, memory 226. The computer software program can include machine instructions that, when executed by a processor such as CPU 224, cause transmitting station 112 to encode video data in the manner described in FIG. 4. Encoder 470 can also be implemented as specialized hardware included in, for example, transmitting station 112. Encoder 470 has the following stages to perform the various functions in a forward path (shown by the solid connection lines) to produce an encoded or compressed bitstream 488 using input video stream 350: an intra/inter prediction stage 472, a transform stage 474, a quantization stage 476, and an entropy encoding stage 478. Encoder 470 may also include a reconstruction path (shown by the dotted connection lines) to reconstruct a frame for encoding of future blocks. In FIG. 4, encoder 470 has the following stages to perform the various functions in the reconstruction path: a dequantization stage 480, an inverse transform stage 482, a reconstruction stage 484, and a loop filtering stage 486. Other structural variations of encoder 470 can be used to encode video stream 350.

When video stream 350 is presented for encoding, each frame 356 can be processed in units of blocks. At the intra/inter prediction stage 472, each block can be encoded using intra-frame prediction (also called intra prediction) or inter-frame prediction (also called inter prediction). In any case, a prediction block can be formed. In the case of intra-prediction, the prediction block may be formed from samples in the current frame that have been previously encoded and reconstructed. In the case of inter-prediction, the prediction block may be formed from samples in one or more previously constructed reference frames. As described in accordance with the teachings herein, a combined prediction block that combines inter prediction and intra prediction is also possible.

Next, still referring to FIG. 4, the prediction block can be subtracted from the current block at intra/inter prediction stage 472 to produce a residual block (also called a residual). Transform stage 474 transforms the residual into transform coefficients in, for example, the frequency domain. Examples of block-based transforms include the Karhunen-Loève Transform (KLT), the Discrete Cosine Transform (DCT), the Singular Value Decomposition Transform (SVD) and the Asymmetric Discrete Sine Transform (ADST). In one example, the DCT transforms the block into the frequency domain. In the case of DCT, the transform coefficient values are based on spatial frequency, with the lowest frequency (DC) coefficient at the top-left of the matrix and the highest frequency coefficient at the bottom-right of the matrix. Note that the size of the prediction block may be different from the size of the transform block.

Quantization stage 476 converts the transform coefficients into discrete quantum values, which are referred to as quantized transform coefficients, using a quantizer value or a quantization level. The quantized transform coefficients are then entropy encoded by entropy encoding stage 478. The entropy-encoded coefficients, together with other information used to decode the block, which may include for example the type of prediction used, motion vectors and quantizer value, are then output to the compressed bitstream 488. Compressed bitstream 488 can be formatted using various techniques, such as variable length coding (VLC) or arithmetic coding. Compressed bitstream 488 can also be referred to as an encoded video stream or encoded video bitstream and the terms will be used interchangeably herein.

The reconstruction path in FIG. 4 (shown by the dotted connection lines) can be used to ensure that both encoder 470 and a decoder 500 (described below) use the same reference frames to decode compressed bitstream 488. The reconstruction path performs functions that are similar to functions that take place during the decoding process that are discussed in more detail below, including dequantizing the quantized transform coefficients at dequantization stage 480 and inverse transforming the dequantized transform coefficients at inverse transform stage 482 to produce a derivative residual block (also called a derivative residual).

At reconstruction stage 484, the prediction block that was predicted at intra/inter prediction stage 472 can be added to the derivative residual to create a reconstructed block. Loop filtering stage 486 can be applied to the reconstructed block to reduce distortion such as blocking artifacts.

Other variations of encoder 470 can be used to encode compressed bitstream 488. For example, a non-transform based encoder 470 can quantize the residual signal directly without transform stage 474 for certain blocks or frames. In another implementation, an encoder 470 can have quantization stage 476 and dequantization stage 480 combined into a single stage.

Figure 5:
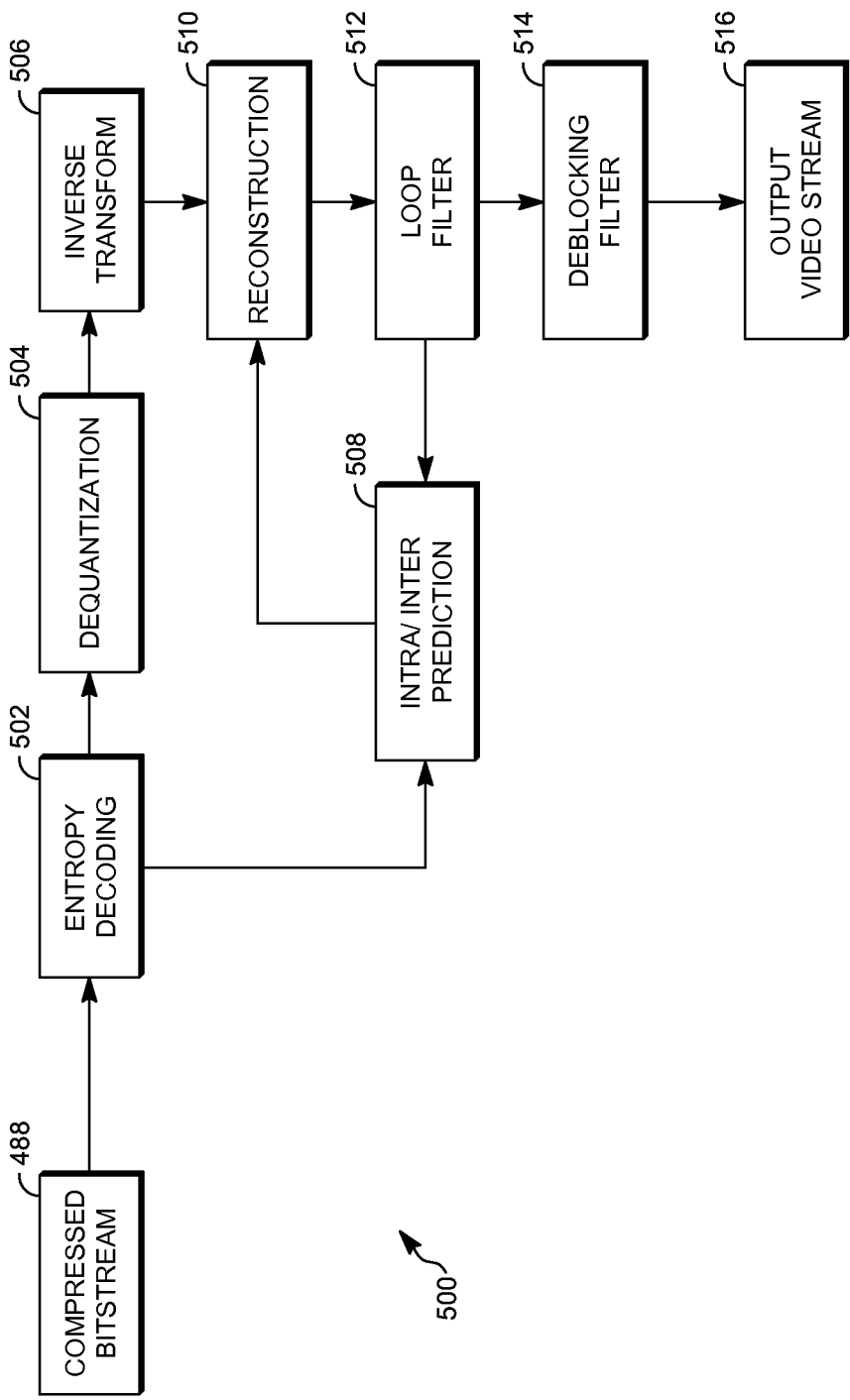
FIG. 5 is a block diagram of a video decompression system according to an aspect of the teachings herein.

FIG. 5 is a block diagram of a decoder 500 in accordance with another implementation. Decoder 500 can be implemented in receiving station 130, for example, by providing a computer software program stored in memory 226. The computer software program can include machine instructions that, when executed by a processor such as CPU 224, cause receiving station 130 to decode video data in the manner described in FIG. 5. Decoder 500 can also be implemented in hardware included in, for example, transmitting station 112 or receiving station 130.

Decoder 500, similar to the reconstruction path of encoder 470 discussed above, includes in one example the following stages to perform various functions to produce an output video stream 516 from compressed bitstream 488: an entropy decoding stage 502, a dequantization stage 504, an inverse transform stage 506, an intra/inter prediction stage 508, a reconstruction stage 510, a loop filtering stage 512 and a deblocking filtering stage 514. Other structural variations of decoder 500 can be used to decode compressed bitstream 488.

When compressed bitstream 488 is presented for decoding, the data elements within compressed bitstream 488 can be decoded by entropy decoding stage 502 (using, for example, arithmetic coding) to produce a set of quantized transform coefficients. Dequantization stage 504 dequantizes the quantized transform coefficients, and inverse transform stage 506 inverse transforms the dequantized transform coefficients to produce a derivative residual that can be identical to that created by inverse transform stage 482 in encoder 470. Using header information decoded from compressed bitstream 488, decoder 500 can use intra/inter prediction stage 508 to create the same prediction block as was created in encoder 470, e.g., at intra/inter prediction stage 472. At reconstruction stage 510, the prediction block can be added to the derivative residual to create a reconstructed block. Loop filtering stage 512 can be applied to the reconstructed block to reduce blocking artifacts. Other filtering can be applied to the reconstructed block. In this example, deblocking filtering stage 514 is applied to the reconstructed block to reduce blocking distortion, and the result is output as output video stream 516. Output video stream 516 can also be referred to as a decoded video stream, and the terms will be used interchangeably herein.

Other variations of decoder 500 can be used to decode compressed bitstream 488. For example, decoder 500 can produce output video stream 516 without deblocking filtering stage 514.

As mentioned briefly above, an application can be included in a computing device 200 such that, when executed by a processor such as CPU 224, the application generates an additional predictor that may be used to improve prediction of a current block. Specifically, the additional predictor is a compound or combined predictor that combines pixels of an intra predictor and an inter predictor for the block. The combination may be formed as described with reference initially to FIG. 6.

Figure 6:
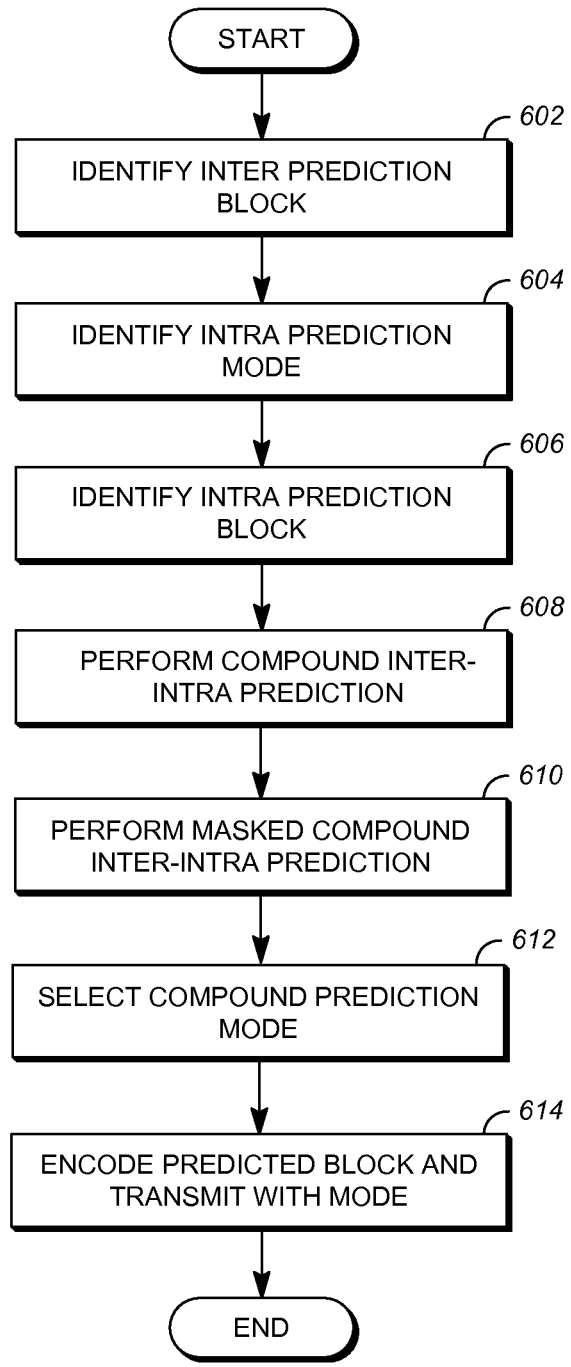
FIG. 6 is a flowchart diagram of a process for predicting a block using combined intra and inter prediction blocks according to an aspect of the teachings herein.

FIG. 6 is a flowchart diagram of a process 600 for predicting a block using combined intra and inter prediction blocks according to an aspect of the teachings herein. Process 600 can be implemented in a system such as computing device 200 to code a video stream. Process 600 can be implemented, for example, as a software program that is executed by a computing device such as transmitting station 112 or receiving station 130. The software program can include machine-readable instructions that are stored in a memory such as memory 226 that, when executed by a processor such as CPU 224, cause the computing device to perform process 600. Process 600 can also be implemented using hardware in whole or in part. As explained above, some computing devices may have multiple memories and multiple processors, and the steps of process 600 may in such cases be distributed using different processors and memories. Use of the terms "processor" and "memory" in the singular herein encompasses computing devices that have only one processor or one memory as well as devices having multiple processors or memories that may each be used in the performance of some but not necessarily all recited steps.

For simplicity of explanation, process 600 is depicted and described as a series of steps. However, steps in accordance with this disclosure can occur in various orders and/or concurrently. Additionally, steps in accordance with this disclosure may occur with other steps not presented and described herein. Furthermore, not all illustrated steps may be required to implement a method in accordance with the disclosed subject matter.

At step 602, an inter prediction block for a block of a frame of a video stream is identified. Herein, "identify" means to determine, select, choose, calculate or identify in any manner whatsoever. As discussed above, inter prediction generally uses another block (e.g., from a temporally close frame) displaced according to one or more motion vectors as an inter predictor for a current block to be encoded. The motion vectors may be found through any number of search algorithms that seek to match existing encoded pixel information to the current block so as to provide a good predictor for the current block.

In an implementation, an inter prediction block can be identified as part of a rate/distortion loop, wherein the "rate" is the number of bits required to represent the encoded block including additional bits added to the output encoded video stream to designate the motion vectors and frame or frames that contribute to the inter predictor for the encoded block and "distortion" is the number of bits required to represent the residual, or difference between the prediction block and the block to be predicted. In cases where more than one motion vector is calculated and more than one inter prediction block is identified, the prediction blocks can be averaged to form a single inter predictor, for example. Generally, the inter prediction block selected is the one whose motion vector results in the lowest rate distortion value of all of the possible choices.

Figures 8, 9A, 9B:
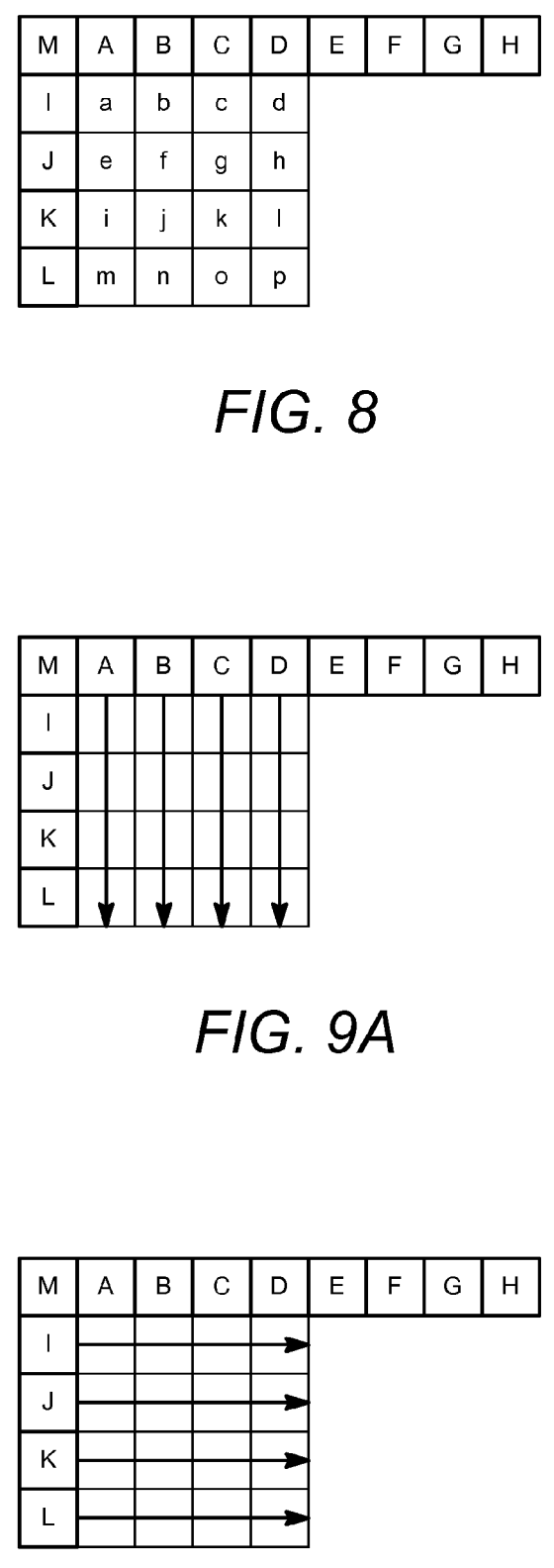

At step 604, an intra prediction block associated with a block of a frame of the video stream is identified. As discussed briefly above, intra prediction uses pixels surrounding a block to predict the contents of the block. FIG. 8 is a diagram of a 4×4 block used to illustrate adjacent pixels used in the formation of an intra prediction block. While FIG. 8 uses an example of a 4×4 block, techniques disclosed herein can be used with other block sizes including, without limitation, blocks having 8×8, 16×16, 32×32 or 64×64 pixels. Rectangular block sizes, for example those comprising 8×16 or 16×8 pixels, may also be used. The 4×4 block in FIG. 8 is represented by pixels a-p, and its peripheral pixels are labeled A-M. Pixel values for pixels A-M can be used to predict pixel values for pixels a-p by extending the values of peripheral pixels A-M to a prediction block having the same size as the block to be predicted.

More specifically, intra prediction relies on the fact that for some portions of a video stream, the contents of a block may be accurately predicted using pixels peripheral to the block. The pixels A-M, which occur on the top and left of a current block are used in the example of FIG. 8 since blocks of a frame are often encoded in raster scan order, from the upper left corner of the frame from left to right along rows descending from the top to the bottom of the frame. In this fashion, for a given block, the pixels A-M peripheral to the block will have been encoded and subsequently decoded prior to being used to predict the block such that the peripheral pixels will attain the same value in the encoder as will be encountered by a decoder. However, other pixels may be used (e.g., when using a different scan order).

An intra prediction mode may be selected by the encoder as part of a rate distortion loop, either alone or in combination with the rate distortion loop described above with respect to identifying the inter prediction block. In brief, various intra prediction modes may be tested to determine which type of prediction will have the lowest distortion for a given rate, or number of bits to be transmitted in an encoded video bitstream, including overhead bits included in the bitstream to indicate the type of prediction used. Distortion can be measured by calculating a measure of the residual block, which is the data remaining after subtracting a prediction block from a data block. One example of a measure of the residual block is a sum of absolute differences (SAD). SAD can be calculated by summing the absolute difference between the prediction block and the block to be predicted on a pixel-by-pixel basis. The smaller the SAD, the more accurately the prediction block predicts the block to be predicted.

Figure 9C:
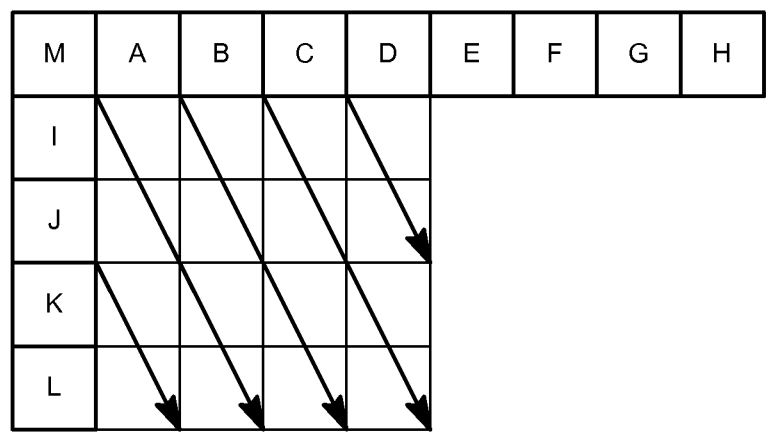

FIGS. 9A-9H are diagrams showing examples of intra prediction modes for the block of FIG. 8. In FIG. 9A, an intra prediction mode referred to generally as a vertical intra prediction mode V_PRED is shown. In this mode, prediction block pixels corresponding to the locations of pixels a, e, i and j of the block to be predicted are set to the value of peripheral pixel A, prediction block pixels corresponding to the locations of pixels b, f, j and n of the block to be predicted are set to the value of pixel B, prediction block pixels corresponding to the locations of pixels c, g, k and o of the block to be predicted are set to the value of pixel C, and prediction block pixels corresponding to the locations of pixels d, h, l and p of the block to be predicted are set to the value of pixel D. Alternative techniques for implementing vertical intra prediction mode V_PRED may combine two or more peripheral pixels to calculate a pixel value to be used in the prediction block, such as by averaging the values of the peripheral pixels.

FIG. 9B shows a horizontal intra prediction mode H_PRED. In this example, pixel I is used to set the values of prediction block pixels corresponding to the locations of pixels a, b, c and d of the block to be predicted, pixel J is used to set the values of prediction block pixels corresponding to the locations of pixels e, f, g and h of the block to be predicted, pixel K is used to set the values of prediction block pixels corresponding to the locations of pixels i, j, k and l of the block to be predicted, and pixel L is used to set the values of prediction block pixels corresponding to the locations of pixels m, n, o and p of the block to be predicted. As in the above-described prediction mode, the peripheral pixels can be combined to set the prediction block pixel values instead of merely repeating the values of a single peripheral pixel across all pixel locations of the prediction block.

FIG. 9C shows an oblique intra prediction mode D117_PRED, so-called because the direction of the arrows along which the peripheral pixels will be propagated to generate the prediction block form a diagonal at an angle of about 117° from the horizontal. In this example of an intra prediction mode, the peripheral pixels or combinations of two or three peripheral pixels are propagated to form the prediction block in the direction of the arrows in FIG. 9C. For example, pixels in the prediction block corresponding to the locations of pixels i and m of the block to be predicted are set to a value formed from pixels J and K, and so forth.

Figure 9D:
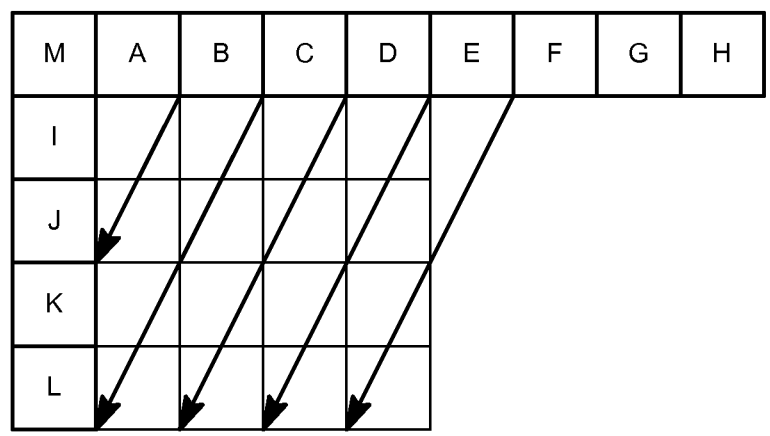

FIG. 9D shows another oblique intra prediction mode D63_PRED, so-called because the direction of the arrows along which the peripheral pixels are propagated to generate the prediction block form a diagonal at an angle of about 63° from the horizontal. In this example of an intra prediction mode, the peripheral pixels or combinations of two or three peripheral pixels are propagated to form the prediction block in the direction of the arrows in FIG. 9D. For example, pixels in the prediction block corresponding to the locations of pixels a and e of the block to be predicted are set to a value formed from pixels A and B, and so forth.

Figure 9E:
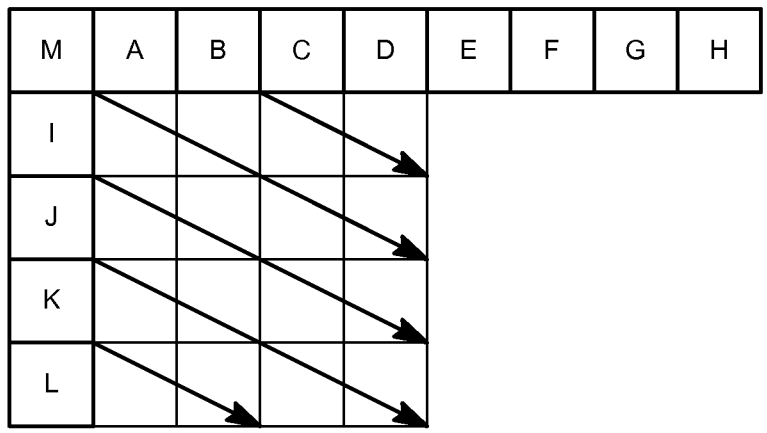

FIG. 9E shows another oblique intra prediction mode D153_PRED, so-called because the direction of the arrows along which the peripheral pixels are propagated to generate the prediction block form a diagonal at an angle of about 153° from the horizontal. In this example of an intra prediction mode, the peripheral pixels or combinations of two or three peripheral pixels are propagated to form the prediction block in the direction of the arrows in FIG. 9E. For example, pixels in the prediction block corresponding to the locations of pixels c and d of the block to be predicted are set to a value formed from pixels B and C, and so forth.

Figure 9F:
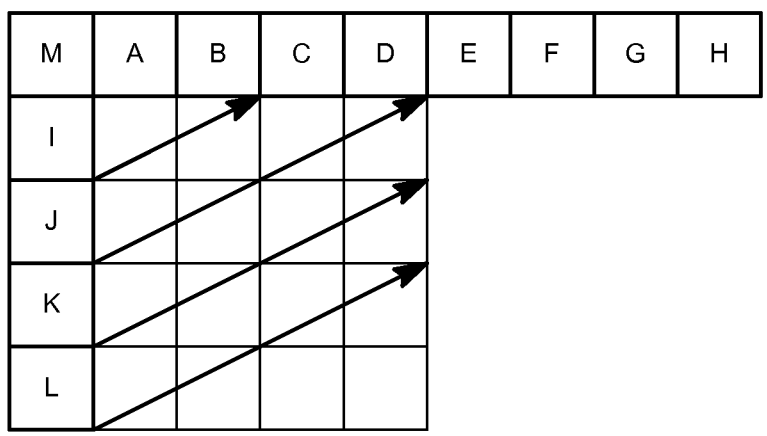

FIG. 9F shows another oblique intra prediction mode D27_PRED, so-called because the direction of the arrows along which the peripheral pixels are propagated to generate the prediction block form a diagonal at an angle of about 27° from the horizontal. In this example of an intra prediction mode, the peripheral pixels or combinations of two or three peripheral pixels are propagated to form the prediction block in the direction of the arrows in FIG. 9F. For example, pixels in the prediction block corresponding to the locations of pixels a and b in the block to be predicted are set to a value formed from pixels I and J, and so forth.

Figure 9G:
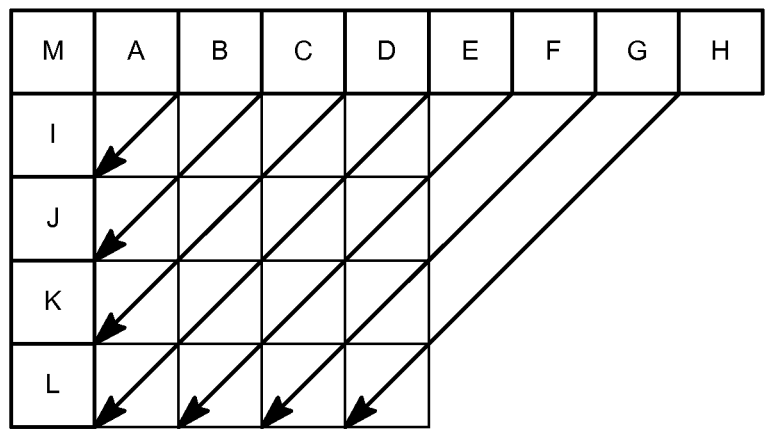

FIG. 9G shows another oblique prediction mode D135_PRED, so-called because the direction of the arrows along which the peripheral pixels are propagated to generate the prediction block form a diagonal at an angle of about 135° from the horizontal. In this example of an intra prediction mode, the peripheral pixels or combinations of two or three peripheral pixels are propagated to form the prediction block in the direction of the arrows in FIG. 9G. For example, pixels in the prediction block corresponding to the locations of pixels b and e in the block to be predicted are set to a value formed from pixels B and C, and so forth.

Figure 9H:
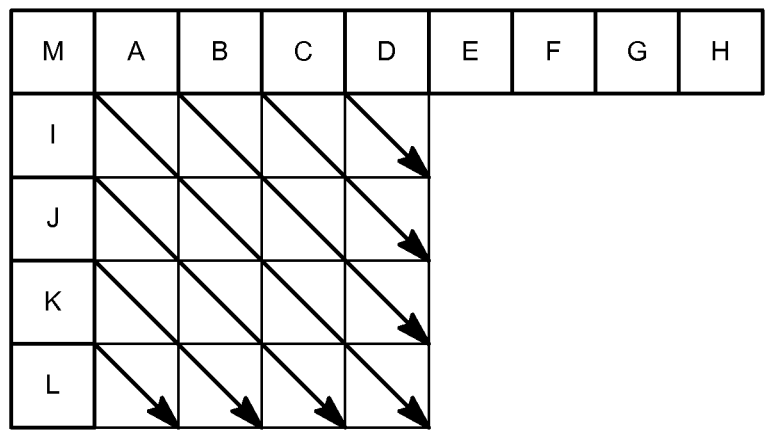

FIG. 9H shows another oblique prediction mode D45_PRED, so-called because the direction of the arrows along which the peripheral pixels are propagated to generate the prediction block form a diagonal at an angle of about 45° from the horizontal. In this example of an intra prediction mode, the peripheral pixels or combinations of two or three peripheral pixels are propagated to form the prediction block in the direction of the arrows in FIG. 9H. For example, pixels in the prediction block corresponding to the locations of pixels c and h in the block to be predicted are set to a value formed from pixels B and C, and so forth.

Other intra prediction modes may form a single value from combinations of the peripheral pixels A-M and set prediction block pixels a-p to the single value. These modes, sometimes called DC_PRED and TM_PRED, form a single pixel value from combinations of subsets of the pixels A-M and propagate the single value throughout the prediction block.

Returning to FIG. 6, at step 606, an intra prediction mode identified in step 604 through the rate distortion loop is used to identify an intra prediction block. In this example, available intra prediction modes are described above in relation to FIGS. 9A-9H and the single value modes DC_PRED and TM_PRED, so the intra prediction block is generated as described above for the selected intra prediction mode. More, fewer and/or different intra prediction modes than those described herein may be available. Further, and while shown as separate steps, step 606 is frequently combined with step 604.

At step 608, the identified inter and intra prediction blocks are combined using a first technique. This first technique is referred to as compound inter-intra prediction and the resulting combined predictor may be referred to as a compound predictor to distinguish it from a masked compound predictor discussed below.

The accuracy with which a pixel of a block can be predicted by either inter or intra prediction may be dependent upon the distance of the pixel from the peripheral pixel that formed the prediction value. For example, when pixels a, b, d and e of the 4×4 block of FIG. 8 are intra predicted using an intra predictor generated using the value of peripheral pixel as shown in FIG. 9B, pixel a may be the most accurately predicted by intra prediction (i.e., its value is closest to the corresponding pixel value of the prediction block), while pixel d may be more accurately predicted using inter prediction since it is further from pixel I within the block. The peripheral pixels that form prediction pixels for any given intra predictor can be referred to as a prediction edge.

To take advantage of this possibility, process 600 combines the intra and inter prediction blocks for a block to be predicted with reference to the intra prediction mode in step 608. That is, each intra prediction mode at a given block size may be associated with a constant weighting block of the same size that provides the weight for the intra predictor as compared to the inter predictor. For example, if the weighting matrix for a given mode and block size n×n is given by a n×n matrix W with values between 0 and 1, then the prediction value P[i, j] of a pixel at location [i, j] is obtained by the following calculation:

$$P[i,j]=W[i,j]*\text{intrapredictor}[i,j]+(1-W[i,j])*\text{interpredictor}[i,j]; \text{ where}$$

intrapredictor is the predictor for a given intra prediction mode; and
interpredictor is the inter predictor obtained from one or two motion vectors (e.g., in step 602). The pixels in the same block location from each predictor as the pixel being formed in the combined prediction block are also referred to herein as being co-located since their respective location [i,j] is the same in each block.

An integer variant of this function where 8-bit precision is used for the weights may be represented by the following pseudo code:

$$P[i,j]=(W[i,j]*\text{intrapredictor}[i,j]+(256-W[i,j])*\text{interpredictor}[i,j]+128)>>8.$$

The weighting matrix W[i, j] is designed for a given intra prediction mode to match the prediction direction or type as discussed above, and can be formed in a variety of ways. In one implementation, the weighting matrix W[i, j] may be obtained from a 1D exponential decay function of the form A+B exp(−Kx), where x represents the distance from the nearest prediction edge. The variables A, B and K are constants generated experimentally. One way of doing this is by calculating sample combined prediction blocks and determining coefficients that yield unity gain as compared to the original input. Some known intra prediction modes described above may use the following weighting strategies:

1) V_PRED mode: Generate the weighting matrix W[i, j] using the 1D exponential decay function with x being the vertical position of a pixel.
2) H_PRED mode: Generate the weighting matrix W[i, j] using the 1D exponential decay function with x being the horizontal position of a pixel.
3) DC_PRED and TM_PRED mode: Use equal weighting (average) pixel values in corresponding locations of the intra and inter predictors.
4) Oblique prediction modes (D63_PRED, D117_PRED, D27_PRED, D153_PRED, D135_PRED and D45_PRED: Generate the weighting matrix W[i, j] using the 1D exponential decay function with x being the oblique distance in the direction of prediction from a pixel to the prediction edge (e.g., the left/top edge).

It may be desirable to introduce some simplifications in the fourth group to avoid the need to store a 2D weighting matrix for each oblique prediction mode and block size. One possible technique to generate the 2D weighting matrix is to use a 1D array to generate the 2D matrix. Pseudo code representing an implementation to generate a 2D weighting matrix and combine the inter and intra prediction blocks for the various oblique intra prediction modes is as follows, where mode is the identified intra prediction mode, interpred is a pointer to the beginning of the block or pixel data representing the identified inter prediction block, interstride is the number to be added to the pixel address to go from one horizontal row of pixels to the next in the inter prediction block, intrapred is a pointer to the beginning of the block of pixel data representing the identified intra prediction block, intrastride is the number to be added to the pixel address to go from one horizontal row of pixels to the next in the intra prediction block, and size is the value of n where the block to be predicted is of size n×n:

```
static void combine_interintra(MB_PREDICTION_MODE mode,
    uint8_t *interpred,
    int interstride,
    uint8_t *intrapred,
    int intrastride,
    int size) {
  static const int scale_bits = 8;
  static const int scale_max = 256; // 1 << scale_bits;
  static const int scale_round = 127; // (1 << (scale_bits − 1));
  // This table is a function A + B*exp(−Kx), where x is the horizontal
  index
  static const int weights1d[64] = {
      128, 125, 122, 119, 116, 114, 111, 109,
      107, 105, 103, 101, 99, 97, 96, 94,
      93, 91, 90, 89, 88, 86, 85, 84,
```

```
    83, 82, 81, 81, 80, 79, 78, 78,
    77, 76, 76, 75, 75, 74, 74, 73,
    73, 72, 72, 71, 71, 71, 70, 70,
    70, 70, 69, 69, 69, 69, 68, 68,
    68, 68, 68, 67, 67, 67, 67, 67,
};
int size_scale = (size >= 64 ? 1:
            size == 32 ? 2 :
            size == 16 ? 4 :
            size == 8 ? 8 : 16);
int i, j;
switch (mode) {
    case V_PRED:
        for (i = 0; i < size; ++i) {
            for (j = 0; j < size; ++j) {
                int k = i * interstride + j;
                int scale = weights1d[i * size_scale];
                interpred[k] =
                    ((scale_max - scale)*interpred[k] +
                    scale * intrapred[i * intrastride + j] + scale_round)
                    >> scale_bits;
            }
        }
        break;
    case H_PRED:
        for (i = 0; i < size; ++i) {
            for (j = 0; j < size; ++j) {
                int k = i * interstride + j;
                int scale = weights1d[j * size_scale];
                interpred[k] =
                    ((scale_max - scale)*interpred[k] +
                    scale * intrapred[i * intrastride + j]+ scale_round)
                    >> scale_bits;
            }
        }
        break;
    case D63_PRED:
    case D117_PRED:
        for (i = 0; i < size; ++i) {
            for (j = 0; j < size; ++j) {
                int k = i * interstride + j;
                int scale = (weights1d[i * size_scale] * 3 +
                    weights1d[j * size_scale]) >> 2;
                interpred[k] =
                    ((scale_max - scale)*interpred[k]+
                    scale * intrapred[* intrastride +j]+ scale_round)
                    >> scale_bits;
            }
        }
        break;
    case D27_PRED:
    case D153_PRED:
        for (i = 0; i < size; ++i) {
            for (j = 0; j < size; ++j) {
                int k = i * interstride + j;
                int scale = (weights1d[j * size_scale]* 3 +
                    weights1d[i * size_scale]) >> 2;
                interpred[k] =
                    ((scale_max - scale) * interpred[k] +
                    scale * intrapred[i * intrastride + j] + scale_round)
                    >> scale_bits;
            }
        }
        break;
    case D135_PRED:
        for (i = 0; i < size; ++i) {
            for (j = 0; j < size; ++j) {
                int k = i * interstride + j;
                int scale = weights1d[(i < j ? i : j) * size_scale];
                interpred[k] =
                    ((scale_max - scale) * interpred[k] +
                    scale * intrapred[* intrastride + j] + scale_round)
                    >> scale_bits;
            }
        }
        break;
    case D45_PRED:
        for (i = 0; i < size; ++i) {
            for (j = 0; j < size; ++j) {
                int k = i * interstride + j;
                int scale = (weights1d[i * size_scale] +
                    weights1d[j * size_scale]) >> 1;
                interpred[k]=
                    ((scale_max - scale) * interpred[k] +
                    scale * intrapred[i * intrastride + j] + scale_round)
                    >> scale_bits;
            }
        }
        break;
    case DC_PRED:
    case TM_PRED:
    default:
        // simple average
        for (i = 0; i < size; ++i) {
            for (j = 0; j < size; ++ j) {
                int k = i * interstride + j;
                interpred[k]= (interpred[k] + intrapred[i * intrastride + j]) >> 1;
            }
        }
        break;
}
```

Stated simply, instead of storing a 2D weighting matrix for each prediction mode and block size, a single array weights 1d is generated that represents the output of a single 1D exponential function A+B*exp(-Kx), where x is the horizontal index, for an 8×8 block of pixels. The values are based on a maximum pixel value of 256. Then, every n value of array weights 1d is selected depending on the size n×n of the block to be predicted. The selected values are used to generate the combined predictor using interpred and intrapred depending on the intra prediction mode. In the pseudocode above, for example, the values are used to generate a value scale based on the distance of the current pixel from the prediction edge(s). The value scale is then used as a multiplier for the intra predictor values, while (scale_max−scale) is used as a multiplier for the inter predictor values. The combined predictor, in the code above, writes over the inter predictor, but this is shown only by example. The combined predictor may be written elsewhere in memory.

Blocks encoded using a combined intra and inter prediction mode may be identified in the encoded video bitstream along with one or more motion vectors for inter prediction and a single intra prediction mode. The set of intra prediction modes used as candidates for such a combination mode may be different from the set of modes used for coding using only an intra prediction mode. The determination of whether to encoded a block using an intra prediction mode, an inter prediction mode or the combined inter/intra prediction mode may be made by, for example, generating a rate distortion value for the block encoded using combined inter/intra prediction mode and selecting the coding mode with the lowest rate distortion value. Other ways of selecting the final coding mode for the block are possible.

Figure 7:
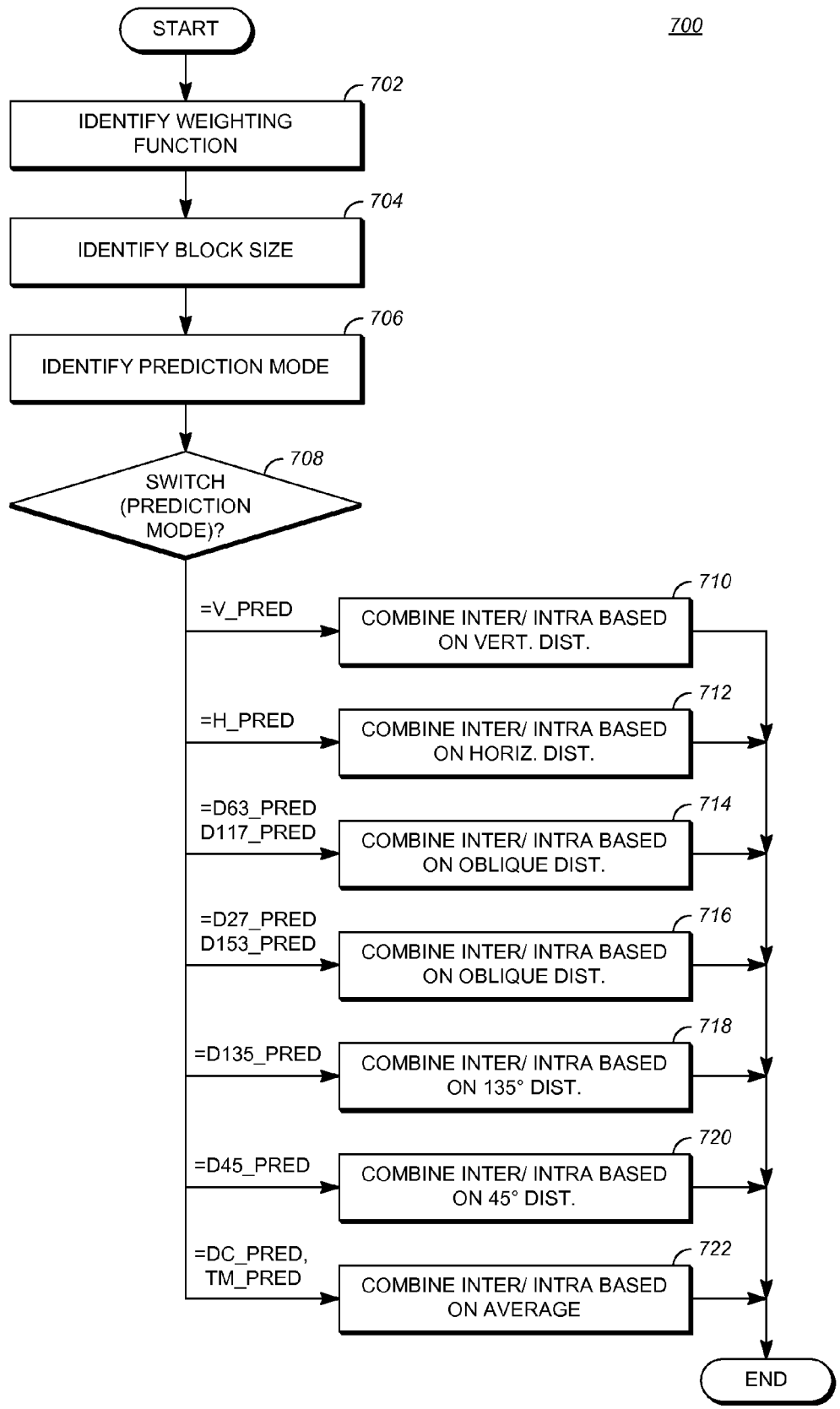
FIG. 7 is a flowchart diagram of a process for combining inter and intra prediction blocks according to a first technique.

The above pseudo code of step 608 can be represented by the flowchart in FIG. 7. FIG. 7 is a flowchart diagram of a process 700 for combining inter and intra prediction blocks according to the first technique, that is, compound inter-intra prediction.

At step 702, a weighting function is identified. In this example, the weighting function is the 1D exponential decay function weights 1d[64]. At step 704, the block size of the current block (i.e., the block to be encoded) is identified. At step 706, the intra prediction mode used to predict the current block is identified. At step 708, the identified intra prediction mode is used in a switch statement to select the appropriate routine to execute to combine the intra and inter prediction blocks according to the intra prediction mode.

At step 710, the intra and inter prediction blocks are combined according to intra prediction mode V_PRED. This corresponds to combining the pixels values as described in case V_PRED above. At step 712, the intra and inter prediction blocks are combined according to intra prediction mode H_PRED. This corresponds to combining the pixels values as described in case H_PRED above. At step 714, the intra and inter prediction blocks are combined according to intra prediction modes D63_PRED and D117_PRED. This corresponds to combining the pixels values as described in cases D63_PRED and D117_PRED above.

At step 716, the intra and inter prediction blocks are combined according to intra prediction modes D27_PRED and D153_PRED. This corresponds to combining the pixels values as described in cases D27_PRED and D153_PRED above. At step 718, the intra and inter prediction blocks are combined according to intra prediction mode D135_PRED. This corresponds to combining the pixels values as described in case D135_PRED above. At step 720, the intra and inter prediction blocks are combined according to intra prediction mode D45_PRED. This corresponds to combining the pixels values as described in case D45_PRED above. At step 722, the intra and inter prediction blocks are combined according to intra prediction modes DC_PRED and TM_PRED. In this combination, pixel values of the inter and intra prediction blocks are averaged to form the prediction block, corresponding to cases DC_PRED and TM_PRED above.

Returning again to FIG. 6, after the generation of the compound predictor in step 608, its rate-distortion value associated with predicting the current block may be calculated and stored before process 600 advances to step 610. At step 610, the identified inter and intra prediction blocks are combined using a second technique. This second technique is referred to as masked compound inter-intra prediction and the resulting combined predictor may be referred to as a masked compound predictor to distinguish it from the compound predictor discussed above.

Figure 10:
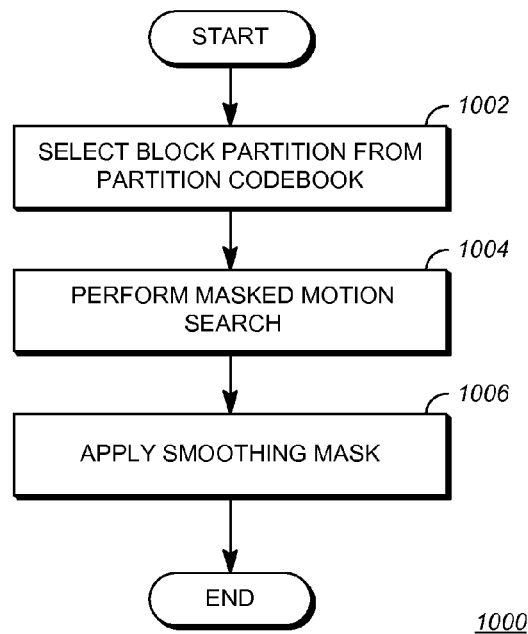
FIG. 10 is a flowchart diagram of a process for combining inter and intra prediction blocks according to a second technique.

FIG. 10 is a flowchart diagram of a process 1000 for combining inter and intra prediction blocks according to the second technique. At step 1002, a block partition is selected from a partition codebook. A partition codebook may be explained with reference to FIG. 11, which is a diagram of a block 1100 illustrating possible borders 1102, 1104, 1106, 1108 between partitions for a partition codebook used in the process of FIG. 10.

Figures 11, 12:
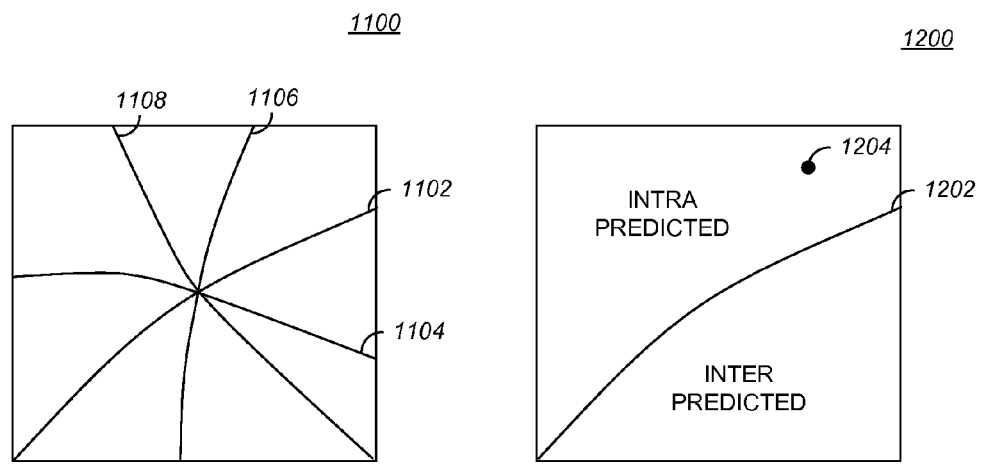
FIG. 11 is a diagram of a block illustrating possible borders for a partition codebook used in the process of FIG. 10.
FIG. 12 is a diagram of a block used to illustrate the process of FIG. 10.

In FIG. 11, a square block 1100 is shown. The matrix of pixels forming block 1100 are not shown, but block 1100 may be of any size (i.e., any dimensions) and may not be square. Borders 1102, 1104, 1106, 1108 are oblique, curved lines that define possible partitions of the block between pixels that will be intra predicted versus those that will be inter predicted. While four borders 1102, 1104, 1106, 1108 defining four different partitions of block 100 are shown, more or fewer are possible. In one implementation, there are sixteen available partitions for a block. The partition codebook may be defined by a series of binary indices such as 000, 001, 010, etc., each identifying a border.

Selecting the block partition for a current block from the partition codebook may be done in one of several ways. One way of doing so is to perform an exhaustive analysis of selecting each available partition, performing inter prediction of a first partition of the block, performing intra prediction of a second partition of the block for each available intra prediction mode and generating a rate-distortion value based on predicting the current block using each resulting combined prediction block. As can be seen from FIGS. 9A-9H, a large number of available intra prediction modes (e.g., 10 modes) may make this a very computationally-intensive process, although it may result in the omission of the masked motion search of step 1004 discussed below.

Another possible way to select the block partition is to modify the process just described by using a single motion vector candidate to compare to the combinations of different available partitions and different available intra prediction modes. This technique is less computationally intensive and has the benefit in that the rate would be the same for one candidate motion vector and one candidate intra prediction mode, so the partition may be selected as the partition that results in the lowest distortion. The candidate motion vector may be the motion vector(s) found in step 602 for the entire block.

A further modification of this process involves using the best inter predictor and best intra predictor for the entire block as a starting point for selecting the block partition in step 1002. More specifically, the inter prediction block of step 602 (also called an inter predictor) and the intra prediction block of step 606 (also called an intra predictor) may be used to generate the pixel values used for each possible partition of the current block. For example, and referring to FIG. 12, one border 1202 is shown splitting block 1200 into two partitions, one labeled "intra predicted" and the other labeled "inter predicted." For each such partitioning, pixel values from the inter predictor of step 602 may be placed in co-located pixel locations in the partition labeled "inter predicted," while pixel values from the intra predictor of step 606 may be placed in co-located pixel locations in the partition labeled "intra predicted." Pixels on the border 1202 may be averaged in one implementation. The result is a prediction block that may be used to generate a rate-distortion value for the prediction of block 1200 that is associated with border 1202. This formation of a prediction block and calculation of rate-distortion value may be performed for each partition available to block 1200. As mentioned previously, the number of partitions in a partition codebook can vary—one factor may be the size of block 1200 (e.g., a smaller block may have fewer available partitions). The partition resulting in the lowest rate-distortion value may be selected as the block partition from the partition codebook in step 1002.

This latter process describes what may be considered to be a "hard" partition between the "inter predicted" partition and the "intra prediction" partition. That is, if one were to consider the resulting predictor block to be a combination of the inter predictor and the intra predictor overlaid by a weighting mask, the weights would vary such that pixel values from the inter predictor would be weighted at zero in the "intra predicted" partition, while co-located pixel values of the intra predictor would be weighted at one. Similarly, pixel values from the intra predictor would be weighted at zero in the "inter predicted" partition, while co-located pixel values of the inter predictor would be weighted at one. This can create undesirable discontinuities in the resulting predictor block. Since step 1002 is an initial filtering step in process 1000, these discontinuities may be addressed in subsequent steps of process 1000 before the masked compound predictor is produced.

Alternatively or in addition thereto, it may be desirable to use a so-called "soft"-weighted mask that blends the pixel values of the inter predictor and the intra predictor when forming the candidate predictor blocks of step 1002. A soft-weighted mask is a matrix of multipliers that dictate how the two predictors are to be combined. Such masks are described in additional detail below and may also be referred to as a soft-partitioned weighting scheme.

Once the partition is known from step 1002, process 1000 advances to step 1004 to perform a masked motion search. Stated broadly, a masked motion search is a motion search for one or more motion vectors associated with the portion of the current block to be inter predicted. The motion vector for the entire block is useful for filtering, but a more accurate (e.g., lower distortion) prediction may result when only a portion of the block is searched. Desirably, a soft-partitioned weighting scheme is applied to pixels values when calculating the rate-distortion resulting from predicting the block in this step. In such a process, for example, the intra predictor is known from step 1002. An appropriate motion search is then performed to find a matching set of pixels to the inter predicted portion. The whole block corresponding to the matching set of pixels are translated according to the motion vector and are used with the weightings of the mask to calculate the rate-distortion values used to compare various inter prediction options for the selection of the most efficient coding. Thus, step 1004 refines the motion vector(s) for the area (e.g., the partition) that is inter predicted instead of for the entire block.

Optionally, a masked search may be made in step 1004 that determines whether a new intra prediction mode is desirable. This would be performed in a similar manner as described above. Namely, candidate intra predictors would be generated using all possible intra prediction modes or a subset of the possible intra prediction modes that are weighted according to the mask. The resulting rate-distortion values from predicting the intra prediction partition of a block using the respective candidates can then be compared to determine if a more efficient coding of the intra predicted area would result from a different intra predictor. Generally, the lowest error (e.g., the lowest rate distortion value) would be used to select the intra prediction mode similarly to the selection of the motion vector for the inter prediction mode.

Although a hard weighting scheme is possible, it is desirable that the mask used in the masked motion search in step 1004 applies a soft weighting scheme. Whichever scheme is used for the masked motion search in step 1004, a smoothing mask may be applied in step 1006 to generate the masked compound predictor of the second technique. Desirably, the same smoothing mask is also used for the masked motion search and is described next.

One possible smoothing mask provides for weights to change smoothly over each of the partitions, and the contribution from any one of the predictor values for any pixel may not become zero. In other words, pixel values for each of the intra and inter predictors each contribute to a pixel value in the masked compound predictor. A weight may be applied to each of the two predictor values for a pixel in the block of video data that is based on the position of the pixel in the block relative to the border. The resultant values would then be added together, resulting in a single value for each pixel. In such a case, the pixel values of the masked compound predictor may come from only one or the other of the intra predictor or the inter predictor. That is, the starting point of step 1006 is the intra predictor for the current block resulting from step 606 or step 1004, if different, and the inter predictor resulting from the refined motion vector of step 1004.

Then process 1000 may read a weighting mask from a mask codebook (e.g., stored in memory) for each pixel in the block. Each entry in the mask codebook may provide a weight that indicates whether only one predictor is used or the other, or a weighted combination of the two. The following discussion refers to pixel 1204 in FIG. 12 as a reference assuming it is at a pixel position i, j.

In this example, the weight is a number between 0 and 16, but other ranges are within the scope of this disclosure. If P1 and P2 indicate the two pixel values from the inter and intra predictors, and m is the mask index, then the overall (or combined) predictor value obtained for each pixel [i, j] in the block may be given by:

$$P[i,j]=P1[i,j]*W[m,i,j]+P2[i,j]*(16-W[m,i,j]).$$

The function W[m, i, j] could be represented generally, such as in a table with the partition codebook. In one implementation, multiple mask codebooks may be stored based on the size (e.g., dimensions) of the block.

Alternatively, or in addition to, the function W[m, i, j] may be represented as polynomial function in i and j poly_m( ) for each m, followed by applying a smoothing function smoother( ) For example, the function W[m, i, j] may be given by:

$$W[m,i,j]=\text{smoother}(\text{poly\_}m(i,j)); \text{ where}$$

poly_m can be represented by a set of coefficients for each m. For example, the function poly_m( ) may be a linear function as follows:

$$\text{poly\_}m(i,j)=A*(i-i0)+B*(j-j0).$$

The function poly_m( ) may be a non-linear function as follows when the border is curved:

$$\text{poly\_}m(i,j)=A*(i-i0)+B*(j-j0)+C*(i-i0)*(j-j0).$$

In either case, smoother(x) may be equal to (1+tan h(x/k))*16 where A, B, (optionally C), i0 and j0 are provided in a table (e.g., a table corresponding or related to the partition codebook) for each m, and k is a constant. Equation smoother(x) may ensure that the weights become, for example, 0 and 16 farther from the border and transition smoothly close to the border.

One desirable implementation occurs when the borders are straight lines defined by a formula ax+by +c=0 where each line has a slope of 1×2 pixels or 2×1 pixels. Such an implementation simplifies the calculations bit is not a necessary limitation. As seen in FIGS. 11 and 12, the borders may be curved lines. When the candidate borders are straight lines such that the selected border is a straight line, calculation of the weighting factors may involve basing the weight of the pixels on the perpendicular distance of the point from the line ax+by+c=0. The distance to (i, j) would be $|ai+bj+c|/(\sqrt{a^2+b^2})$, and the calculated distances could be used as index values in the codebook to obtain weighting values. In this example, pixel 1204 could be associated with a weighting of 0.7 for the intra prediction pixel and 0.3 for the inter prediction pixel. The same weightings could be used in the calculations of step 1004 for whichever of inter or intra prediction is being performed.

After the smoothing mask is applied in step 1006, a masked compound predictor results and process 1000 ends. Referring again to FIG. 6, the results of predicting the current block using the compound predictor of step 608 and the masked compound predictor of step 610 are compared to each other and with, for example, the result of predicting the block using only inter or intra prediction (i.e., without partitioning as described herein) in step 612. The most efficient encoding mode for the current block is selected. The determination of whether to encoded a block using an intra prediction mode, an inter prediction mode or one of the combined inter/intra prediction modes may be made by, for example, generating rate-distortion values for the block encoded using combined inter/intra prediction modes and selecting the coding mode with the lowest-rate distortion value. Other ways of selecting the final coding mode for the block are possible. In the example of step 612, one of the compound prediction modes is selected.

At next step 614, the predicted block (e.g. its residual generated using the selected predictor) is encoded into the bitstream with information related to the encoding mode, such as the type of optimal compound predictor. If masked compound prediction is chosen, the information of best border (e.g., the index of the partition codebook for the selected border) and refined motion vector(s) would be included in the bitstream, along with the single intra prediction mode. The set of intra prediction modes used as candidates for such a combination mode may be different from the set of modes used for coding using only an intra prediction mode. After encoding the current block at step 614, process 600 ends. Process may be repeated for some or all blocks of a frame.

While the process as described uses the pixel values of the intra and inter predictors for the weighting and combining, another option is to use the residuals resulting from the difference of each predictor as compared to the block to be predicted for the weighting and combining.

Figure 13:
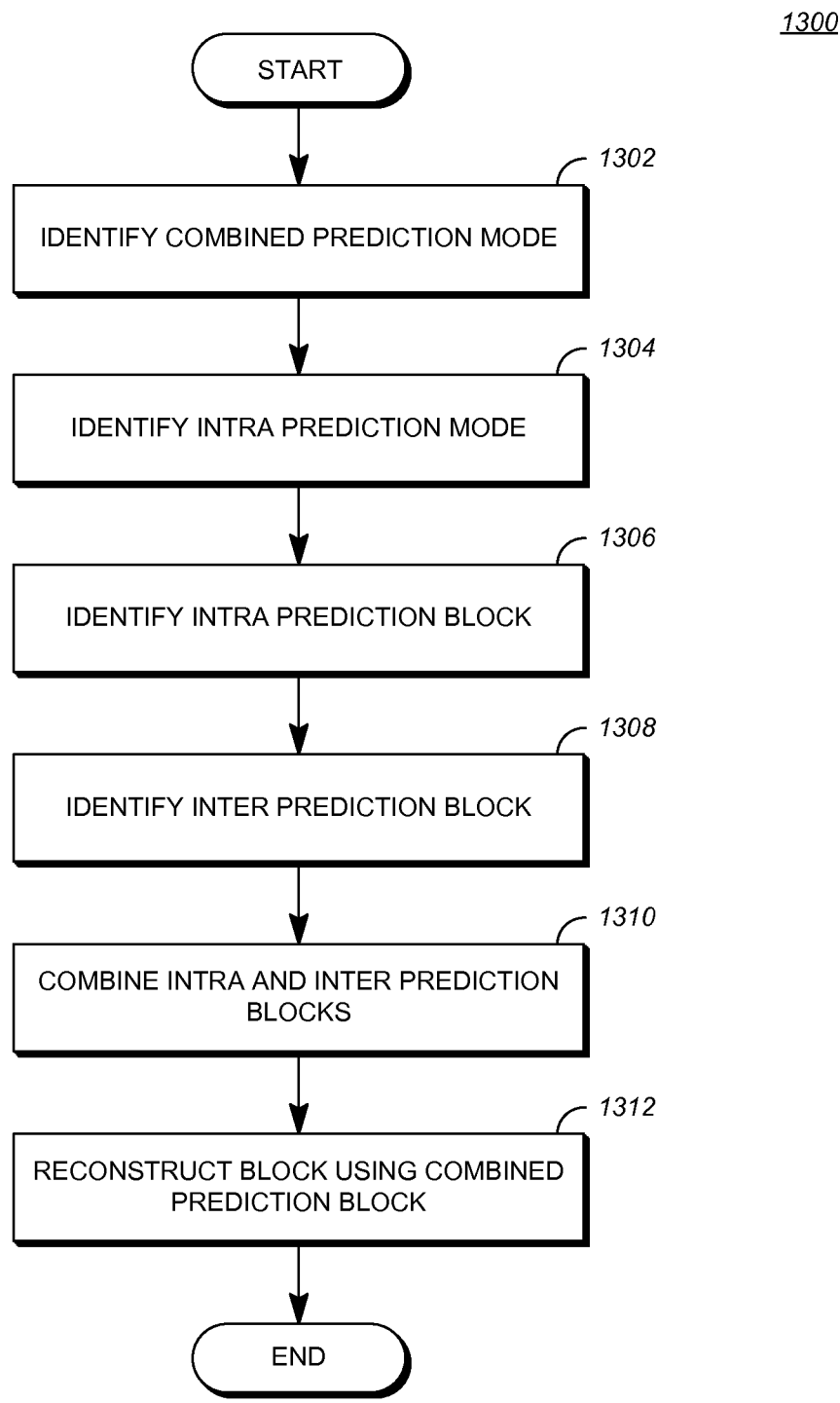
FIG. 13 is a flowchart diagram of a process for decoding a block predicted using combined inter and intra prediction.

FIG. 13 is a flowchart diagram of a process 1300 for decoding a block of a frame of a video stream according to an aspect of the teachings herein. Process 1300 can be implemented in a system such as computing device 200 to decode a block encoded using a compound or combined predictor. Process 1300 can be implemented, for example, as a software program that is executed by a computing device such as transmitting station 112 or receiving station 130. The software program can include machine-readable instructions that are stored in a memory such as memory 226 that, when executed by a processor such as CPU 224, cause the computing device to perform process 1300. Process 1300 can also be implemented using hardware in whole or in part. As explained above, some computing devices may have multiple memories and multiple processors, and the steps of process 1300 may in such cases be distributed using different processors and memories.

For simplicity of explanation, process 1300 is depicted and described as a series of steps. However, steps in accordance with this disclosure can occur in various orders and/or concurrently. Additionally, steps in accordance with this disclosure may occur with other steps not presented and described herein. Furthermore, not all illustrated steps may be required to implement a method in accordance with the disclosed subject matter.

At step 1302, process 1300 identifies that a block of a frame of the video stream has been encoded using combined inter/intra prediction. Combined inter/intra prediction can be identified by reading bits included in a frame or block header of the video stream to indicate that a block has been predicted using combined inter/intra prediction. For example, the bit(s) may include the index of the partition codebook sent in step 614 of process 600. At step 1304, process 1300 can read additional bits included in a frame or block header that indicate which intra prediction mode has been used to form a combined prediction block for the block.

At step 1306, process 1300 can identify an intra prediction block to be used to combine with an inter prediction block identified at step 1308. The intra prediction block is based on the intra prediction mode identified in step 1304. At step 1308, process 1300 can identify an inter prediction block using motion vectors included in a frame or block header of the video stream and one or more reference frames previously decoded by the decoder.

At step 1310, the inter and intra prediction blocks are combined based on the identified intra prediction mode and weights calculated according to the techniques described in relation to FIG. 7 or FIG. 10, above. For example, weights are calculated for each pixel of the prediction block, where the individual weights may be numbers between 0 and 1 and relate to the distance from the closest prediction edge in intra prediction or from the border. In some implementations, the pixels of the intra prediction block are multiplied by the weights while the pixels of the inter prediction block are multiplied by one minus the respective weight so that the two products for each pixel may be combined to form the combined prediction block pixel value. At step 1312, the block is reconstructed using its residual from the bitstream and the combined prediction block as part of the multistep decoding process as described in relation to FIG. 5, above.

The combined inter-intra prediction modes described herein may improve coding efficiency over using inter or intra prediction alone for a block. The proposed techniques can cover many cases not well handled by pure inter or intra prediction, such as new objects appearing as a part of the block. The masked compound inter-intra prediction may make prediction more adapted to irregular motion edges because it allows geometric partitions approximating motion edges, both sides of which are predicted in the most efficient ways. More accurate predictions will reduce the energy of prediction errors and finally reduce the bitrate of compressed videos. Experiments validate that the teachings herein reduce the bitrate by 1.4% and 0.7% on two different standard video test sets.

The aspects of encoding and decoding described above illustrate some exemplary encoding and decoding techniques. However, it is to be understood that encoding and decoding, as those terms are used in the claims, could mean compression, decompression, transformation, or any other processing or change of data.

The words "example" or "exemplary" are used herein to mean serving as an example, instance, or illustration. Any aspect or design described herein as "example" or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or". That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an implementation" or "one implementation" throughout is not intended to mean the same embodiment or implementation unless described as such.

Implementations of transmitting station 112 and/or receiving station 130 (and the algorithms, methods, instructions, etc., stored thereon and/or executed thereby, including by encoder 470 and decoder 500) can be realized in hardware, software, or any combination thereof. The hardware can include, for example, computers, intellectual property (IP) cores, application-specific integrated circuits (ASICs), programmable logic arrays, optical processors, programmable logic controllers, microcode, microcontrollers, servers, microprocessors, digital signal processors or any other suitable circuit. In the claims, the term "processor" should be understood as encompassing any of the foregoing hardware, either singly or in combination. The terms "signal" and "data" are used interchangeably. Further, portions of transmitting station 112 and receiving station 130 do not necessarily have to be implemented in the same manner.

Further, in one aspect, for example, transmitting station 112 or receiving station 130 can be implemented using a general purpose computer or general purpose processor with a computer program that, when executed, carries out any of the respective methods, algorithms and/or instructions described herein. In addition or alternatively, for example, a special purpose computer/processor can be utilized which can contain other hardware for carrying out any of the methods, algorithms, or instructions described herein.

Transmitting station 112 and receiving station 130 can, for example, be implemented on computers in a video conferencing system. Alternatively, transmitting station 112 can be implemented on a server and receiving station 130 can be implemented on a device separate from the server, such as a hand-held communications device. In this instance, transmitting station 112 can encode content using an encoder 470 into an encoded video signal and transmit the encoded video signal to the communications device. In turn, the communications device can then decode the encoded video signal using a decoder 500. Alternatively, the communications device can decode content stored locally on the communications device, for example, content that was not transmitted by transmitting station 112. Other suitable transmitting station 112 and receiving station 130 implementation schemes are available. For example, receiving station 130 can be a generally stationary personal computer rather than a portable communications device and/or a device including an encoder 470 may also include a decoder 500.

Further, all or a portion of implementations of the present invention can take the form of a computer program product accessible from, for example, a tangible computer-usable or computer-readable medium. A computer-usable or computer-readable medium can be any device that can, for example, tangibly contain, store, communicate, or transport the program for use by or in connection with any processor. The medium can be, for example, an electronic, magnetic, optical, electromagnetic, or a semiconductor device. Other suitable mediums are also available.

The above-described embodiments, implementations and aspects have been described in order to allow easy understanding of the present invention and do not limit the present invention. On the contrary, the invention is intended to cover various modifications and equivalent arrangements included within the scope of the appended claims, which scope is to be accorded the broadest interpretation so as to encompass all such modifications and equivalent structure as is permitted under the law.

What is claimed is:

1. A method, comprising:
   forming, using a processor, a first combined prediction block for a first block of a video frame by combining weighted pixel values of a first inter prediction block for the first block and weighted pixel values of a first intra prediction block for the first block, wherein a weighting of each pixel value is based on a first intra prediction mode used to generate the first intra prediction block;
   forming a second combined prediction block for the first block of a video frame by:
      selecting a second intra prediction block for the first block using a first partitioned area of the first block;
      selecting a second inter prediction block for the first block using a second partitioned area of the first block, the first partitioned area and the second partitioned area separated by a border, wherein the border is at an angle to an orientation of a row or column of pixels, and wherein the second inter prediction block is a whole prediction block containing a matching set of pixels of the second partitioned area and is selected by performing a motion search of the set of pixels of the second partitioned area; and
      combining, forming the second combined prediction block, pixel values of the second intra prediction block placed at co-located pixel positions in the second combined prediction block and pixel values of the second inter prediction block placed at co-located pixel positions in the second combined prediction block, the pixel values of the second intra prediction block and the pixel values of the second inter prediction block weighted by a weighting function based on a distance of a pixel from the border;
   selecting the first combined prediction block or the second combined prediction block as a predictor block to encode the first block based on generating respective rate-distortion values, wherein the rate-distortion value corresponding to the second combined prediction block is based on the whole prediction block; and
   encoding the first block into a bitstream using the predictor block.

2. The method of claim 1, further comprising:
   selecting the border for the first block from one of a plurality of candidate borders of a partition codebook.

3. The method of claim 2 wherein selecting the border comprises:
   for each candidate border of the plurality of candidate borders of the partition codebook:
      combining a plurality of pixels of the first inter prediction block on a first side of the candidate border with a plurality of pixels of the first intra prediction block on a second side of the candidate border to form a test prediction block;
      calculating an error associated with predicting the first block using the test prediction block; and
      comparing errors calculated for each candidate border to select the border.

4. The method of claim 1 wherein the second intra prediction block is the first intra prediction block.

5. The method of claim 1 wherein the weighting function comprises a look up table indexed to a linear distance of a pixel from the border.

6. The method of claim 1, further comprising:
   identifying the first inter prediction block for the first block;
   identifying the first intra prediction mode from a set of possible intra prediction modes; and
   identifying the first intra prediction block for the first block based on the intra prediction mode.

7. The method of claim 6, further comprising:
   using the first inter prediction block and the first intra prediction block to select the border for the first block from one of a plurality of candidate borders.

8. The method of claim 1, further comprising:
   transmitting an identifier for the border in the bitstream.

9. The method of claim 8 wherein the identifier is an index value of a partition codebook.

10. The method of claim 1 wherein, for each pixel value of a pixel of the first combined prediction block, a pixel value of a co-located pixel of the first intra prediction block closer to a prediction edge of the first intra prediction mode is weighted more than a pixel value of a co-located pixel of the first inter prediction block closer to the prediction edge.

11. An apparatus, comprising:
a memory; and
a processor configured to execute instructions stored in the memory to:
form a first combined prediction block for a first block of a video frame by combining weighted pixel values of a first inter prediction block for the first block and weighted pixel values of a first intra prediction block for the first block, wherein a weighting of each pixel value is based on a first intra prediction mode used to generate the first intra prediction block;
form a second combined prediction block for the first block of a video frame by:
selecting a second intra prediction block for the first block using a first partitioned area of the first block;
selecting a second inter prediction block for the first block using a second partitioned area of the first block, the first partitioned area and the second partitioned area separated by a border, wherein the border is at an angle to an orientation of a row or column of pixels, wherein the second inter prediction block is a whole prediction block containing a matching set of pixels of the second partitioned area and is selected by performing a motion search of the set of pixels of the second partitioned area; and
combining, forming the second combined prediction block, pixel values of the second intra prediction block placed at co-located pixel positions in the second combined prediction block and pixel values of the second inter prediction block placed at co-located pixel positions in the second combined prediction block, the pixel values of the second intra prediction block and the pixel values of the second inter prediction block weighted by a weighting function based on a distance of a pixel from the border;
select the first combined prediction block or the second combined prediction block as a predictor block to encode the first block based on generating respective rate-distortion values, wherein the rate-distortion value corresponding to the second combined prediction block is based on the whole prediction block; and
encode the first block into a bitstream using the predictor block.

12. The apparatus of claim 11 wherein the first intra prediction mode defines a prediction edge and a prediction direction, and the processor is configured to form the first combined prediction block by:
weighting pixel values of pixels of the first intra prediction block by a weighting factor that decreases as a pixel distance from the prediction edge along the prediction direction increases;
weighting pixel values of pixels of the first inter prediction block by a weighting factor that increases as a pixel distance from the prediction edge along the prediction direction increases; and summing the weighted pixel value of the first intra prediction block with weighted pixel values of the first inter prediction block for respective co-located pixels to generate pixel values for pixels of the first combined prediction block.

13. The apparatus of claim 11 wherein the weighting function applies a more even weighting to the pixel values of the second intra prediction block and the pixel values of the second inter prediction block of those pixels closer to the border than of those pixels further from the border.

14. The apparatus of claim 11 wherein the weighting function applies a weight of one to a pixel value of a pixel of the second inter prediction block furthest from the border on a side of the block designated to be inter predicted and applies a weight of zero to a pixel value of a co-located pixel of the second intra prediction block.

15. The apparatus of claim 11 wherein the weighting function comprises a look up table indexed to a linear distance of a pixel from the border and stored in the memory.

16. The apparatus of claim 11 wherein the processor is configured to select the border for the first block from one of a plurality of candidate borders of a partition codebook stored in the memory.

17. The apparatus of claim 16 wherein the processor is configured to select the border by:
for each candidate border of the plurality of candidate borders of the partition codebook:
combining a plurality of pixels of the first inter prediction block on a first side of the candidate border with a plurality of pixels of the first intra prediction block on a second side of the candidate border to form a test prediction block;
calculating an error associated with predicting the first block using the test prediction block; and
comparing errors calculated for each candidate border to select the border.

18. The apparatus of claim 11 wherein the processor is configured to:
use the first inter prediction block and the first intra prediction block to select the border for the first block from one of a plurality of candidate borders.

19. A method for decoding a block of a video frame, comprising:
determining, using a processor, a partition codebook used to encode the block by reading bits in a block header associated with the block;
determining, using the processor, an intra-prediction mode and an intra-prediction block used to encode the block by reading bits in the block header;
determining, using the processor, an inter-prediction block used to encode the block by reading bits in the block header; and
combining the intra-prediction block and the inter-prediction block, wherein the block was encoded by an encoder performing steps comprising:
forming a first combined prediction block for the block by combining weighted pixel values of a first inter prediction block for the block and weighted pixel values of a first intra prediction block for the block;
forming a second combined prediction block for the block by:
selecting a second intra prediction block for the block using a first partitioned area of the block;
selecting a second inter prediction block for the block using a second partitioned area of the block, the first partitioned area and the second partitioned area separated by a border, wherein the border is at an angle to an orientation of a row or column of pixels, and wherein the second inter prediction block is a whole prediction block containing a matching set of pixels of the second partitioned area and is selected by performing a motion search of the set of pixels of the second partitioned area; and combining, forming the second combined prediction block, pixel values of the second intra prediction block placed at co-located pixel positions in the second combined prediction block and pixel values of the second inter prediction block placed at co-located pixel positions in the second combined prediction block, the pixel values of the second intra prediction block and the pixel values of the second inter prediction block weighted by a weighting function based on a distance of a pixel from the border; and selecting the first combined prediction block or the second combined prediction block as a predictor block to encode the block based on generating respective rate-distortion values, wherein the rate-distortion value corresponding to the second combined prediction block is based on the whole prediction block.

* * * * *